(12) United States Patent
Pao

(10) Patent No.: US 8,118,538 B2
(45) Date of Patent: Feb. 21, 2012

(54) OFFSHORE VERTICAL-AXIS WIND TURBINE AND ASSOCIATED SYSTEMS AND METHODS

(75) Inventor: Yih-Ho Michael Pao, Houston, TX (US)

(73) Assignee: Floating Windfarms Corporation, Houston, TX (US)

( * ) Notice: Subject to any disclaimer, the term of this patent is extended or adjusted under 35 U.S.C. 154(b) by 760 days.

(21) Appl. No.: 12/208,395

(22) Filed: Sep. 11, 2008

(65) Prior Publication Data

US 2009/0072544 A1    Mar. 19, 2009

Related U.S. Application Data

(60) Provisional application No. 60/972,099, filed on Sep. 13, 2007, provisional application No. 61/019,117, filed on Jan. 4, 2008.

(51) Int. Cl.
*F01D 5/18* (2006.01)
(52) U.S. Cl. ........................................ 415/115; 415/116
(58) Field of Classification Search .................. 415/115, 415/116
See application file for complete search history.

(56) References Cited

U.S. PATENT DOCUMENTS

| | | | |
|---|---|---|---|
| 1,835,018 A | 12/1931 | Darrieus | |
| 4,264,279 A | 4/1981 | Dereng | |
| 4,415,312 A | 11/1983 | Brenneman | |
| 6,616,402 B2 | 9/2003 | Selsam | |
| 7,075,189 B2 | 7/2006 | Heronemus et al. | |
| 7,112,010 B1 | 9/2006 | Geiger | |
| 7,156,586 B2 | 1/2007 | Nim | |
| 7,198,453 B2 | 4/2007 | Hall | |
| 7,281,902 B2 | 10/2007 | Mortensen | |
| 2003/0168864 A1* | 9/2003 | Heronemus et al. | 290/55 |
| 2004/0169376 A1 | 9/2004 | Ruer et al. | |
| 2004/0262926 A1 | 12/2004 | Hansen | |
| 2007/0001464 A1* | 1/2007 | Kothnur et al. | 290/55 |
| 2007/0040388 A1* | 2/2007 | Nielsen | 290/55 |

(Continued)

FOREIGN PATENT DOCUMENTS

DE    3224976    1/1984

(Continued)

OTHER PUBLICATIONS

European Examination Report from corresponding European Appl. No. 08 830 172.6-1267, dated Jun. 28, 2001.

(Continued)

*Primary Examiner* — Michael Lebentritt
(74) *Attorney, Agent, or Firm* — Wong, Cabello, Lutsch, Rutherford & Brucculeri, LLP

(57) ABSTRACT

An offshore wind turbine has a vertical-axis wind turbine (VAWT) mounted on a platform. The VAWT has a vertical rotor and curved blades coupled to a gearbox and an electric generator. The VAWT can fixedly extend from the platform or may be capable of reclining on the platform either manually or automatically. The platform can be composed of modular elements coupled together. Offshore, the platform can be semi-submersible with the VAWT extending out of the water and with a counterbalance extending below the platform. Alternatively, the platform can float on the water's surface and can have several arms that extend outwardly from the VAWT to increase the platform's footprint. To anchor the turbine offshore, anchoring systems can anchor the platform to the seabed while allowing the floating wind turbine to adjust passively or actively to changes in sea level due to tidal variations or storm swells.

17 Claims, 15 Drawing Sheets

U.S. PATENT DOCUMENTS

| | | | |
|---|---|---|---|
| 2007/0243063 | A1 | 10/2007 | Schellstede |
| 2008/0240864 | A1* | 10/2008 | Belinsky ............... 405/223.1 |
| 2010/0219645 | A1* | 9/2010 | Yamamoto et al. ........... 290/55 |

FOREIGN PATENT DOCUMENTS

| | | |
|---|---|---|
| DE | 19526129 | 1/1997 |
| DE | 20206234 | 8/2002 |
| DE | 10337278 | 3/2005 |
| DE | 10357392 | 4/2005 |
| EP | 1876093 | 1/2008 |
| EP | 2080899 | 7/2009 |
| EP | 2299499 | 3/2011 |
| FR | 1235615 | 6/1959 |
| FR | 1498353 | 5/1966 |
| GB | 2344843 | 6/2000 |
| GB | 2378679 | 2/2003 |
| GB | 2407114 | 4/2005 |
| GB | 2434413 | 7/2007 |
| WO | WO03/004870 A1 | 1/2003 |
| WO | WO 2005/021961 A1 | 3/2005 |
| WO | 2008047011 | 4/2008 |

OTHER PUBLICATIONS

EPO Machine Translation of Description in EP2299499, obtained from http://www.epo.org.

EPO Machine Translation of Description in FR1235615, obtained from http://www.epo.org.

EPO Machine Translation of Description in FR1498353, obtained from http://www.epo.org.

Kerr D: "Support Structures for an Offshore Array of Vertical Axis Wind Turbines—A Design Study," Wind Engineering, Multi-Science Publishing Co., Brentwood, Essex, GB. vol. 10, No. 1, Jan. 1, 1986, pp. 47-61, XP001014352, ISSN: 0309-524X figure 1.

P. Musgrove: "Offshore wind energy systems," Phys. Educ., col. 13, No. 210, 1978, pp. 210-214, XP002575006, Great Britain figure 2.

International Search Report from corresponding case 889-0002WO; International Application No. PCT/US2008/075919, mailed Apr. 7, 2010.

Written Opinion from corresponding case 889-0002WO; International Application No. PCT/US2008/075919.

Search Report from corresponding case 889-0002WO; International Application No. PCT/US2008/075919, mailed Jan. 12, 2010.

Allan; "Wind Power Project Floating Out to North Sea;" Internet article located at http://pesn/com/2005/11/03/9600200_NorskHydro_deep-off-shore-wind/; dated Nov. 3, 2005; 5 pages.

Gjorv; "Hywind—Floating Wind Power Production;" HYDRO Oil & Energy; Power Point Presentation dated May 24, 2006; 18 pages.

"FLOAT—Technical and Economic Feasibility of a Floating Wind Turbine;" David Quarton, Garrad Hassan & Partners Ltd; Powerpoint Presentation; undated; obtained from http://www.energetics.com; 18 pages.

Edwards; "Floating Wind Turbine Could Whip Up Rain;" Internet article located at http://www.newscientist.com/article/dn2309-floating-wind-turbine-could-whip-up-rain.html; dated May 25, 2002; 2 pages.

HYDRO Oil & Energy; "Floating Windmills;" Advertising Circular; dated Oct. 2005; 4 pages.

Chapa; "Floating Wind Turbines in the North Sea;" Internet article located at http://www.inhabitat.com/2007/07/02/floating-wind-turbines-in-the-north-sea/; dated Jul. 2, 2007; 21 pages.

Ong; "Life's Happenings: Horns Rev Wind Farm;" Internet article located at http://johnny-ong.blogspot.com/2007/02/horns-rev-wind-farm.html; dated Feb. 1, 2007; 10 pages.

Haliburton; Deep-Sea Oil Rigs Inspire MIT Designs for Giant Wind Turbines; Internet article located at http://pesn.com/2006/09/22/9500238_MIT_floatign_sind_turbines/; dated Sep. 22, 2006; 6 pages.

Allan; "Floating Offshore Wind Energy and Hydrogen Fuel Generating Company Tipping to Europe or Asia;" Internet article located at http://pesn.com/2005/10/31/9600198_Offshore_Wind_Hydrogen/; dated Oct. 31, 2005; 10 pages.

Bullis; "Giant Wind Turbines;" Internet article located at http://www.technologyreview.com/Eenergy/16801/; dated May 9, 2006; 10 pages.

HYDRO Oil & Energy; "Floating Windmills;" Internet article located at http://www.hydro.com/en/Press-room/News/Archive/2005/November/16878/; dated Nov. 2, 2005; 2 pages.

LaMonica; "MIT Designs 'Invisible,' Floating Wind Turbines;" Internet article located at http://news.cnet.com/MIT-designs-invisible%2C-floating-wind-turbines/2100-11395_3-6116933.html?tag=mncol; dated Sep. 18, 2006; 2 pages.

National Renewable Energy Laboratory; "Wind Turbines Way Offshore;" Internet article located at http://www.news.com/2300-1008-6116851.html; dated Sep. 18, 2006; 1 page.

Musial et al.; "Energy from Offshore Wind;" Presented at the Offshore Technology Conference in Houston Texas on May 1-4, 2006; 14 pages.

Wayman et al.; "Coupled Dyanmic Modelin25 g of Floating Wind Turbine Systems;" Presented at the Offshore Technology conference in Houston, Texas on May 1-4, 2006; 25 pages.

Jonkman et al.; "Development of Fully Coupled Aeroelastic and Hydrodynamic Models for Offshore Wind Turbines;" Presented at the 2006 ASME wind Energy Symposium in Reno, Nevada on Jan. 10-12, 2006; 24 pages.

Butterfield et al.; "Engineering Challenges for Floating Offshore Wind Turbines;" Presented at the 2005 Copenhagen Offshore Wind Conference in Copenhagen, Denmark on Oct. 26-28, 2005; 13 pages.

Jonkman et al.; Development of Fully Coupled Aeroelastic and Hydrodynamic Models for Offshore Wind Turbines; Presented at the 2006 ASME Wind Energy Symposium in Reno, Nevada on Jan. 10-12, 2006; 24 pages.

Stauffer; "Deep-Sea Oil Rigs Inspire Giant Wind Turbines;" MIT Tech Talk; vol. 51, No. 1; Sep. 13, 2006; p. 4 of 8.

"World's First Floating Wind Turbine Launched in Berlin;" Internet article located at http://www.spacedaily.com/reports/Worlds_first_floating_wind_turbine_launched_in_Berlin_999.html Dec. 5, 2007; 3 pages.

Malcolm et al.; "Market, Cost, and Technical Analysis fo Vertical and Horizontal Axis Wind Turbines—Task #2: VAWT vs. AWT Technology;" Paper prepared for Lawrence Berkeley National Laboratory; May 2003; 25 pages.

Ljungstrom; "New Concepts in Vertical Axis Wind Turbines (VAWT) and Applications to Large Multi-MW Size, Off-Shore Wind Turbine Systems;" Copyright American Institute of Aeronautics and Astronautics, Inc.; 1980.

"Wind Sail 2004;" Paper dated Mar. 5, 2004; 186 pages.

\* cited by examiner

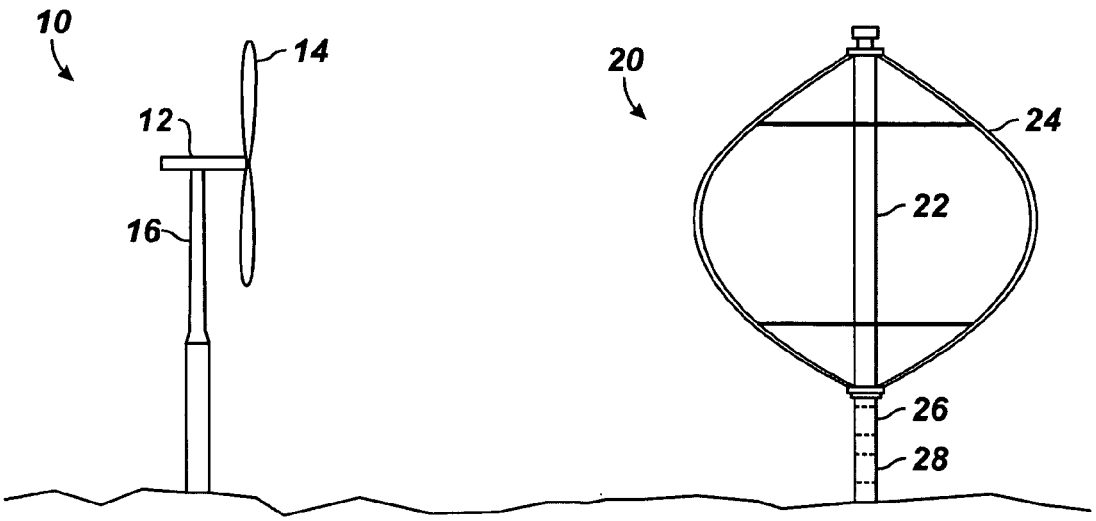
FIG. 1A
*(Prior Art)*
FIG. 1B
*(Prior Art)*
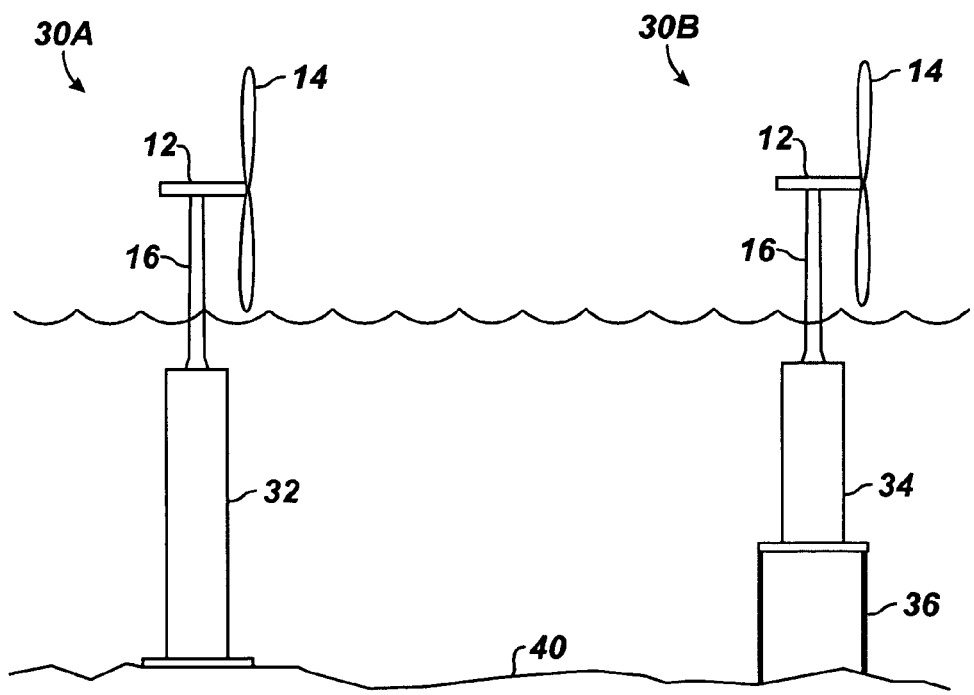
FIG. 2A
*(Prior Art)*
FIG. 2B
*(Prior Art)*

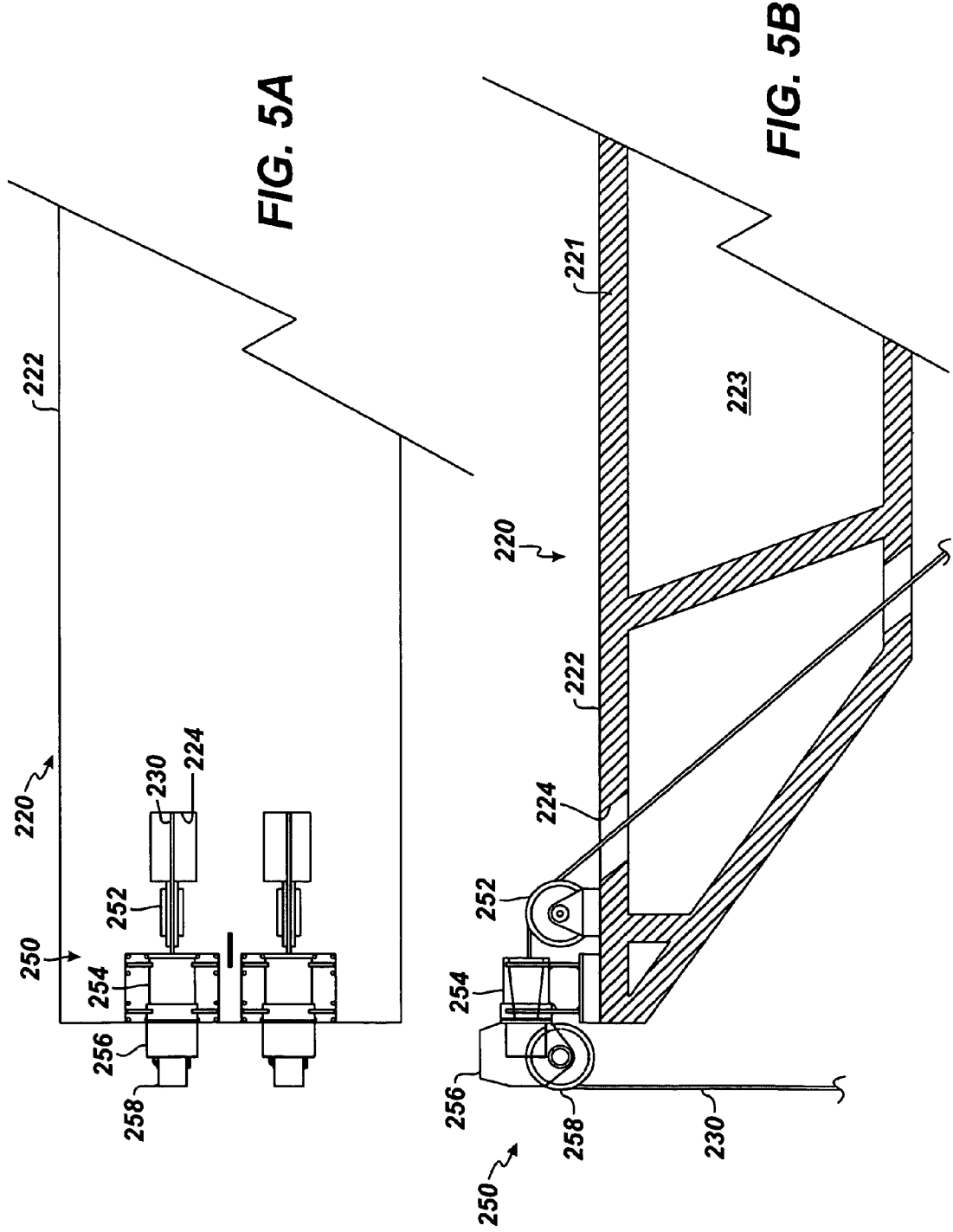

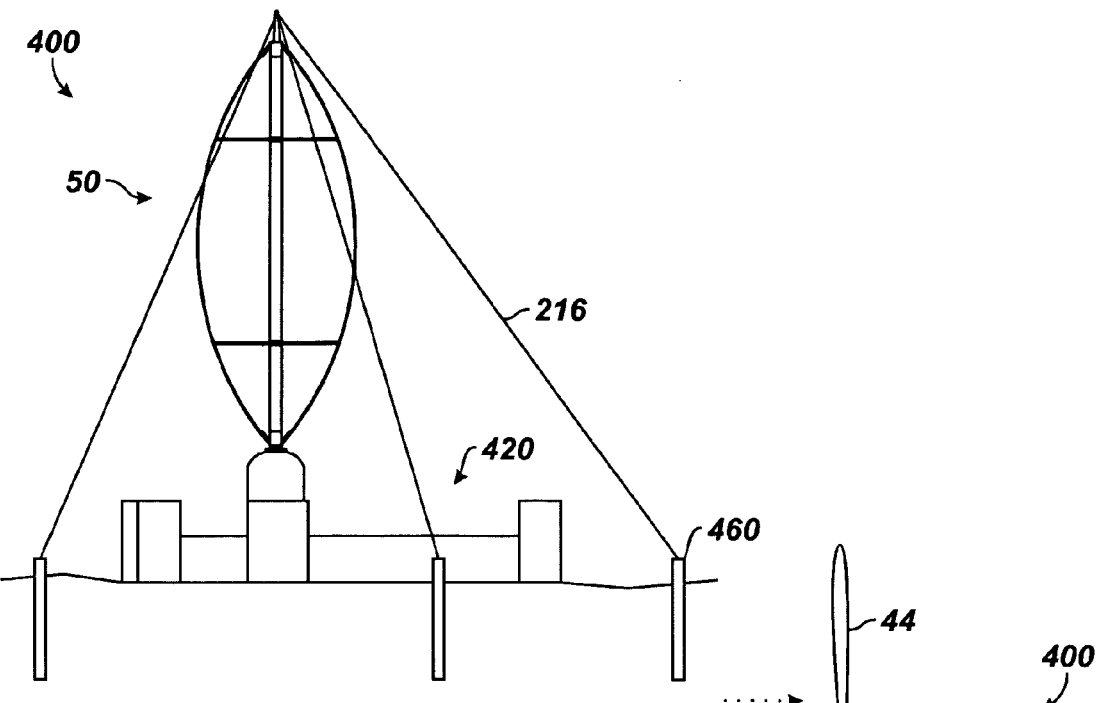
FIG. 7B
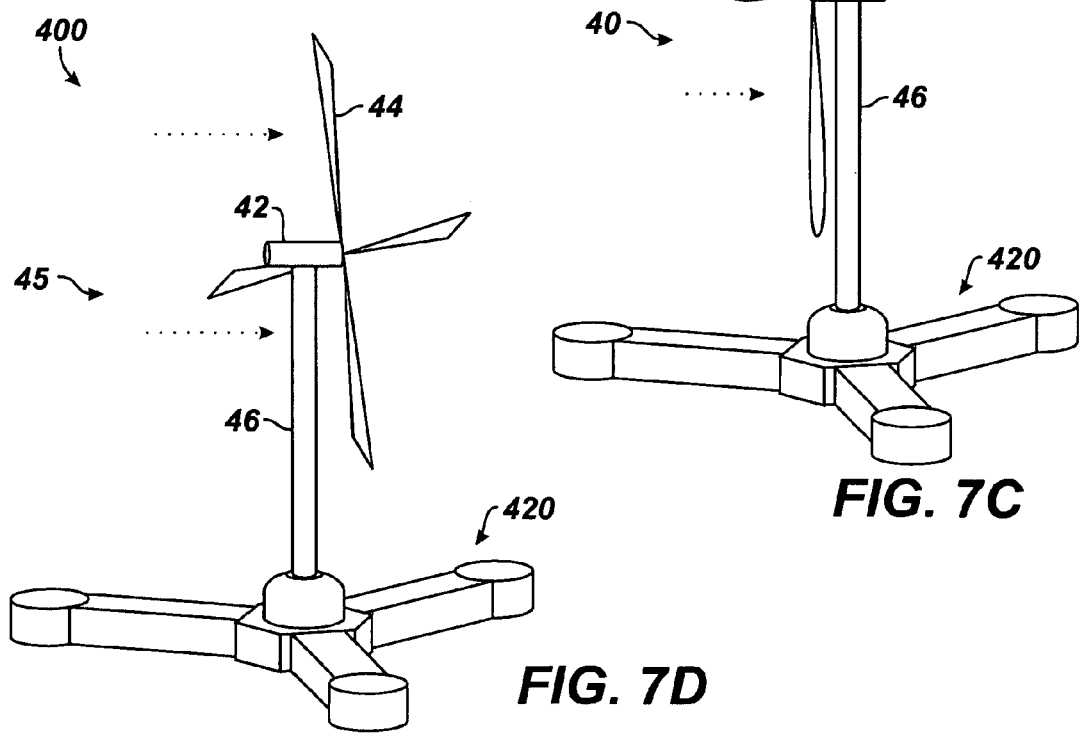
FIG. 7C
FIG. 7D

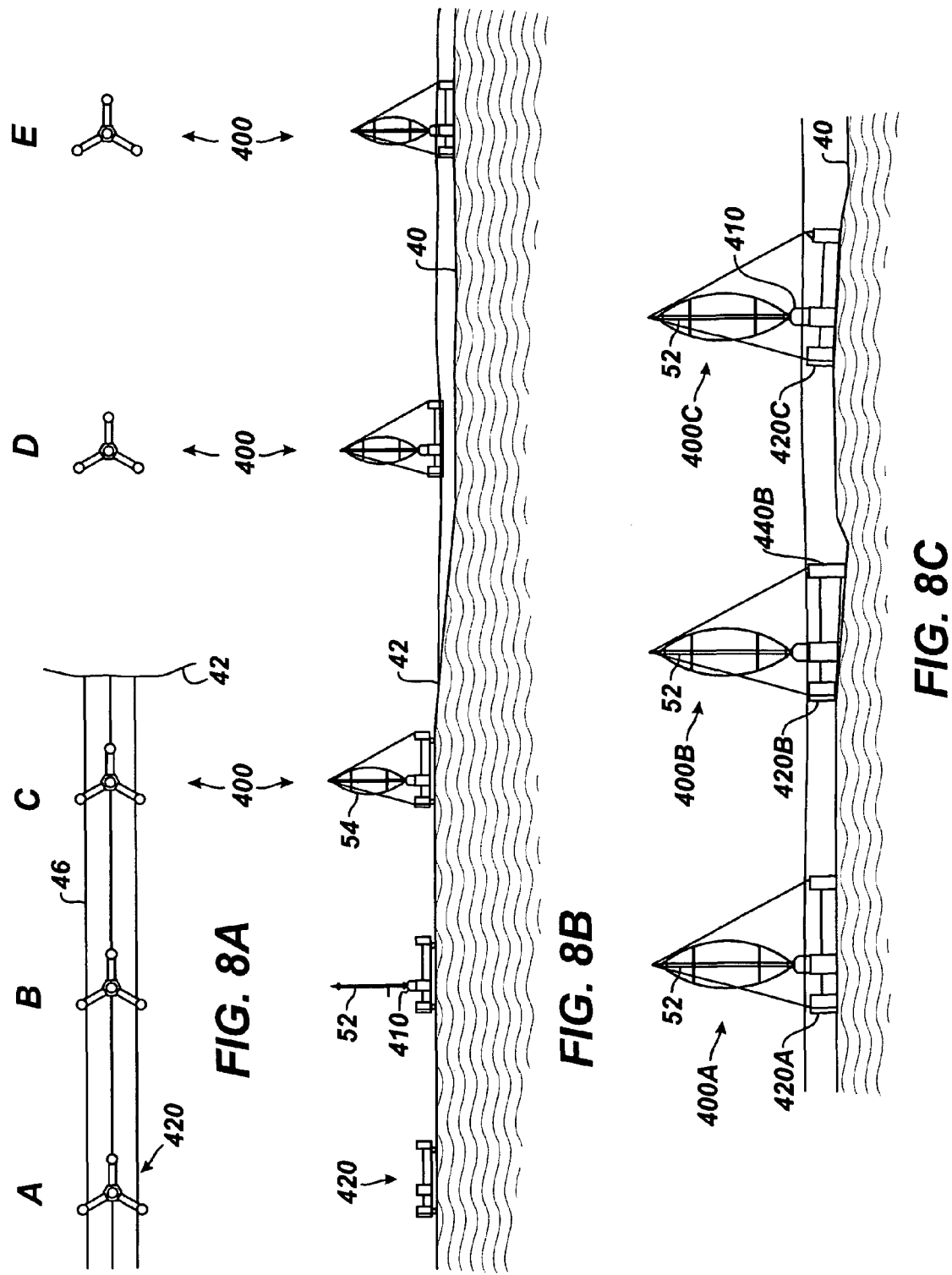

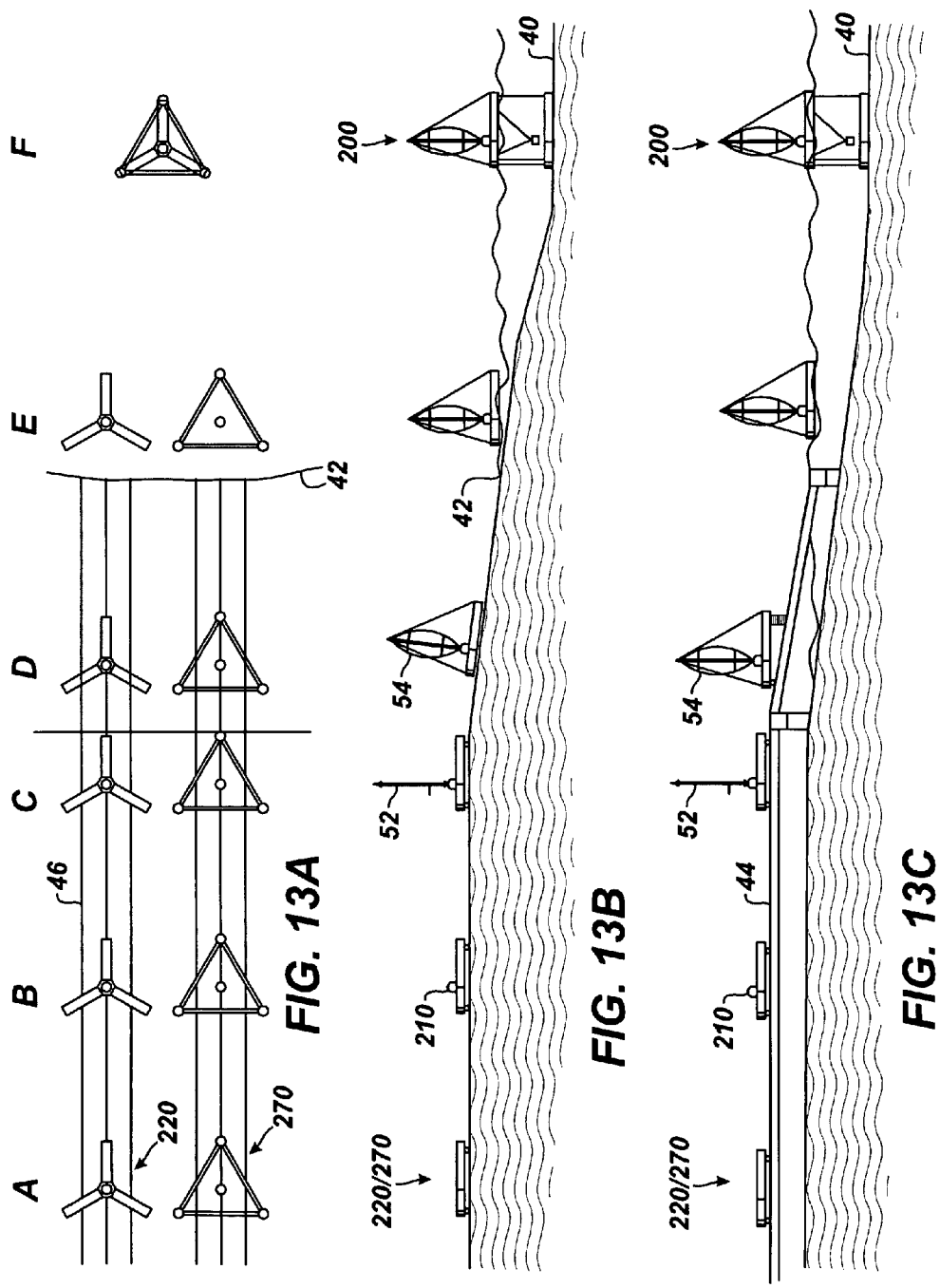

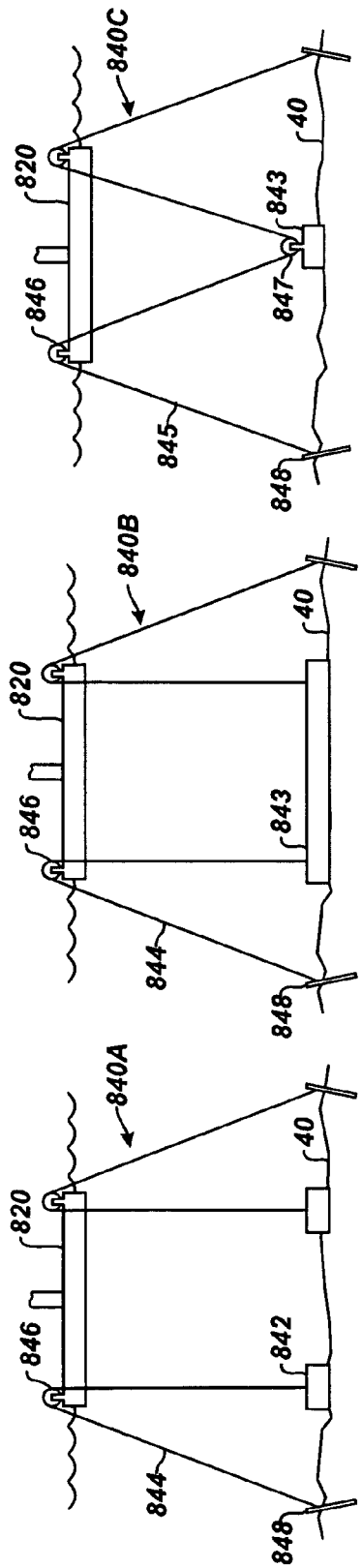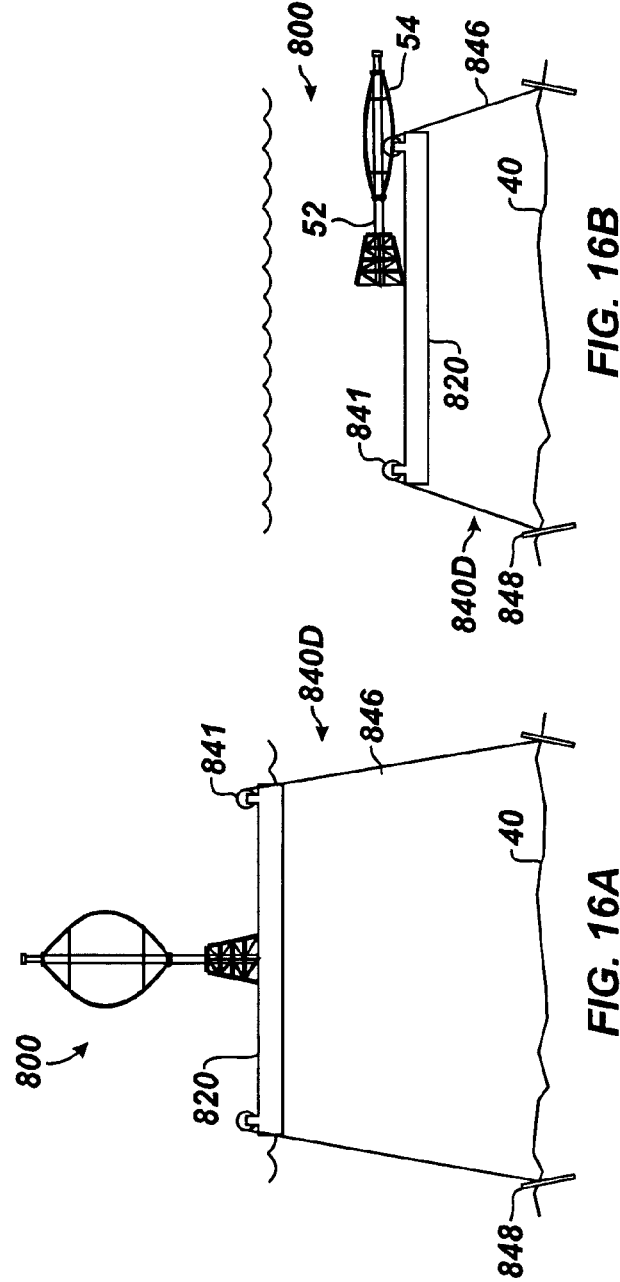

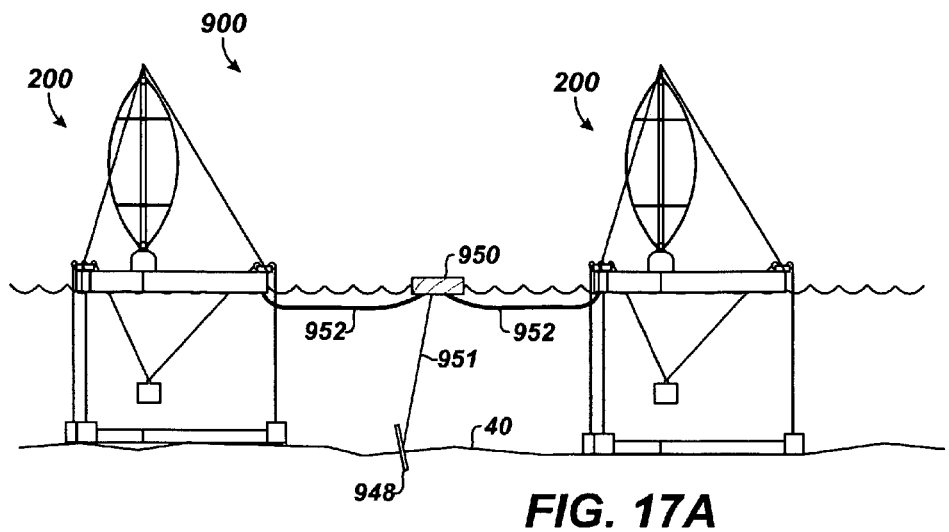
FIG. 17A
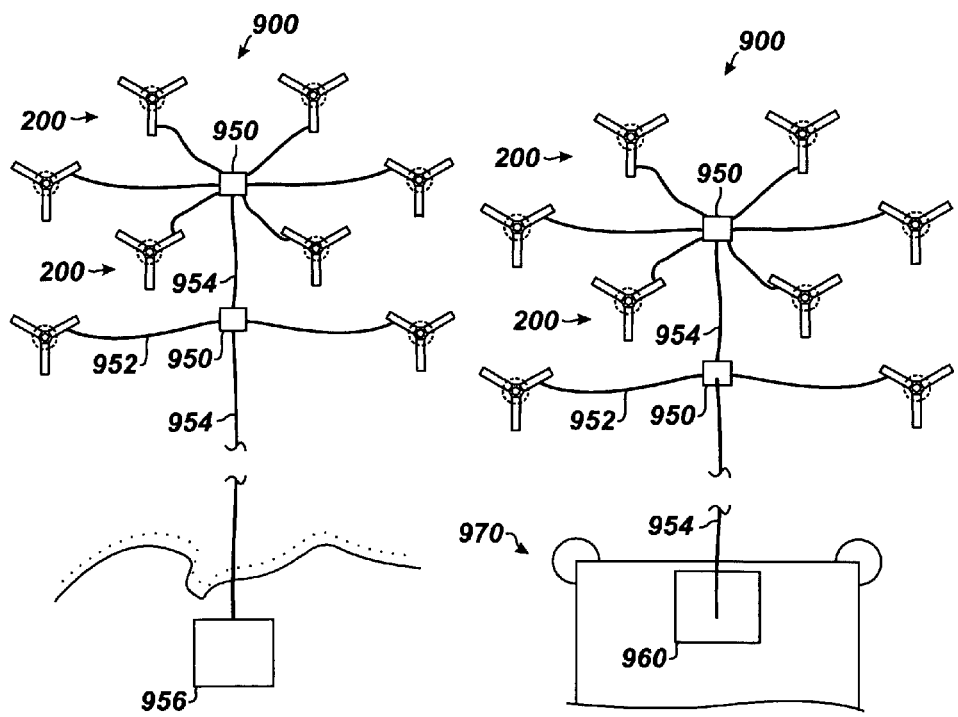
FIG. 17B  FIG. 18

OFFSHORE VERTICAL-AXIS WIND TURBINE AND ASSOCIATED SYSTEMS AND METHODS

CROSS-REFERENCE TO RELATED APPLICATIONS

This application claims priority to U.S. Provisional Appl. No. 60/972,099 filed 13 Sep. 2007 and to U.S. Provisional Appl. No. 61/019,117 filed 7 Jan. 2008, which are both incorporated herein by reference.

BACKGROUND

Wind turbines convert wind energy into electricity. The two main types of wind turbines include the horizontal-axis wind turbines and the vertical-axis wind turbines. The two main types of horizontal-axis wind turbines include the upwind horizontal-axis wind turbines (HAWT) having rotating blades upwind of the tower and include the downwind horizontal-axis wind turbines (HADT) having rotating blades downwind of the tower. The two main types of vertical axis wind turbines include one type having rotating blades without lift generating surfaces and include the Darreius-Type having rotating blades with lift generating airfoils (VAWT).

An upwind horizontal-axis wind turbine (HAWT) 10 without guy cables is shown in FIG. 1A, and a Darrieus-Type vertical-axis wind turbine (VAWT) 20 with curved blades and without guy-cables is shown in FIG. 1B. The Darrieus-type vertical axis wind turbine 20 can have curved blades as shown in FIG. 1B or can have straight blades as stated in the original patent of George Darrieus in 1929.

The HAWT 10 has a rotor 12 and blades 14 with lifting surfaces mounted on a horizontal-axis and directed upwind atop a tower 16. Wind energy incident to the blades 14 rotates the rotor 12, and a gearbox and other components (not shown) coupled to the rotor 12 communicate the rotation to an electric generator (not shown) that converts the rotation to electrical energy. To be effective, the blades 12 must be directed relative to the direction of the wind. Therefore, the HAWT 10 typically has a yaw mechanism (not shown) to allow the blades 14 to rotate around the tower 16.

Because the blades 14 are upwind of the tower 16, they must be made of rigid, strong material so they cannot be bent back by the wind and hit the tower 16. Requiring more rigid materials, the blades 14 are more expensive to manufacture and are heavy. In addition, the tower's yaw mechanism must be strong so it can determine the direction of the wind direction and orient the blades 14 into the direction of the wind. Finally, the tower 16 must also be strong so it can support the heavy rotor, gear-box, generator, and other equipment on top of the tower 16. Therefore, the tower 16 requires more materials, is more expensive to build, and is heavy.

Overall, the HAWT 10 as shown in FIG. 1A is a 'rigid' wind turbine, requires more materials, is heavy, and has a high center of gravity. In addition, it needs to be oriented to face the wind, and requires a firm foundation or platform. Therefore, it is very expensive to build a floating platform to support the HAWT 10, which is heavy, has a high center of gravity, and requires a very stable platform.

By contrast, the VAWT 20 as shown in FIG. 1B has a rotor 22 that runs vertically from the ground and has curved blades 24 connected at the rotor's ends. This vertical rotor 22 sits on a bearing and gearbox component 26 and drives an electric generator 28. Unlike the HAWT 10, the VAWT 20 is omni-directional and does not need to be oriented into the wind. In addition, the VAWT 20 has a low center of gravity with its heavy components such a gearbox, generator, braking and control system positioned near the ground. Therefore, the VAWT 20 does not require an as rigid rotor 22 as with the HAWT's tower (16; FIG. 1A) to support these components. Example of VAWTs in the prior art can be found in the website of www.ecopowerusa.com.

The HAWTs 10 have been widely used in land-based windfarms around the world. HAWTs have also been used in offshore windfarms in Europe. In FIG. 2A, for example, a first type of offshore HAWT 30A has the conventional components of a rotor 12 and blades 14 supported horizontally on a vertical tower 16. These conventional components rest on a fixed support 32 rigidly affixed to the sea floor 40. Examples of the offshore HAWT 30A illustrated in FIG. 2A can be found in U.S. Patent Application Publication 2007/0040388, published February 2007, and PCT Published Application WO/03/004870, published Jan. 16, 2003.

In FIG. 2B, another type of offshore HAWT 30B also has the conventional components of rotor 12, blades 14, and tower 16, but these components rest on a floating support 34 that is rigidly affixed to the sea floor 40 by cables 36. An example of the HAWT 30B illustrated in FIG. 2B can be found in PCT Application Publication 2005/021961, published Mar. 10, 2005. As these prior art publications disclose many well-known implementation details concerning the design and operation of wind turbines generally, they are all incorporated herein by reference in their entireties.

BRIEF DESCRIPTION OF THE DRAWINGS

FIG. 1A shows a land-based upwind horizontal-axis wind turbine according to the prior art.

FIG. 1B shows a land-based vertical-axis wind turbine according to the prior art.

FIG. 2A shows an upwind horizontal-axis wind turbine according to the prior art having a fixed support offshore.

FIG. 2B shows an upwind horizontal-axis wind turbine according to the prior art having a floating support offshore.

FIGS. 5A-5B show top and cross-sectional views of an end of the floating barge's arm having a pulley system for raising or lowering the anchor with winches (not shown).

FIG. 7B shows the offshore wind turbine of FIG. 7A with an alternative form of attaching guy cables to the VAWT.

FIG. 7C shows a horizontal axis wind turbine on the submersible floating platform of FIG. 7A.

FIG. 7D shows a downwind horizontal axis wind turbine on the submersible floating platform of FIG. 7A.

FIGS. 8A-8C show steps to assemble the disclosed offshore wind turbine of FIG. 7A on the beach and deploy it into the sea.

FIGS. 13A-13C show steps to assemble the disclosed floating wind turbines having portable anchors.

FIGS. 15A-15C show various passively adjustable anchoring systems for the disclosed offshore wind turbines.

FIGS. 16A-16B show an actively adjustable anchoring system for the disclosed offshore wind turbines.

FIGS. 17A-17B show a wind farm matrix having an arrangement of multiple offshore wind turbines interconnected together at an offshore location and connected to a land-based station.

FIG. 18 shows a wind farm matrix having an arrangement of multiple offshore wind turbines interconnected together at an offshore location and connected to a desalination system.

DETAILED DESCRIPTION

Figure 3A:
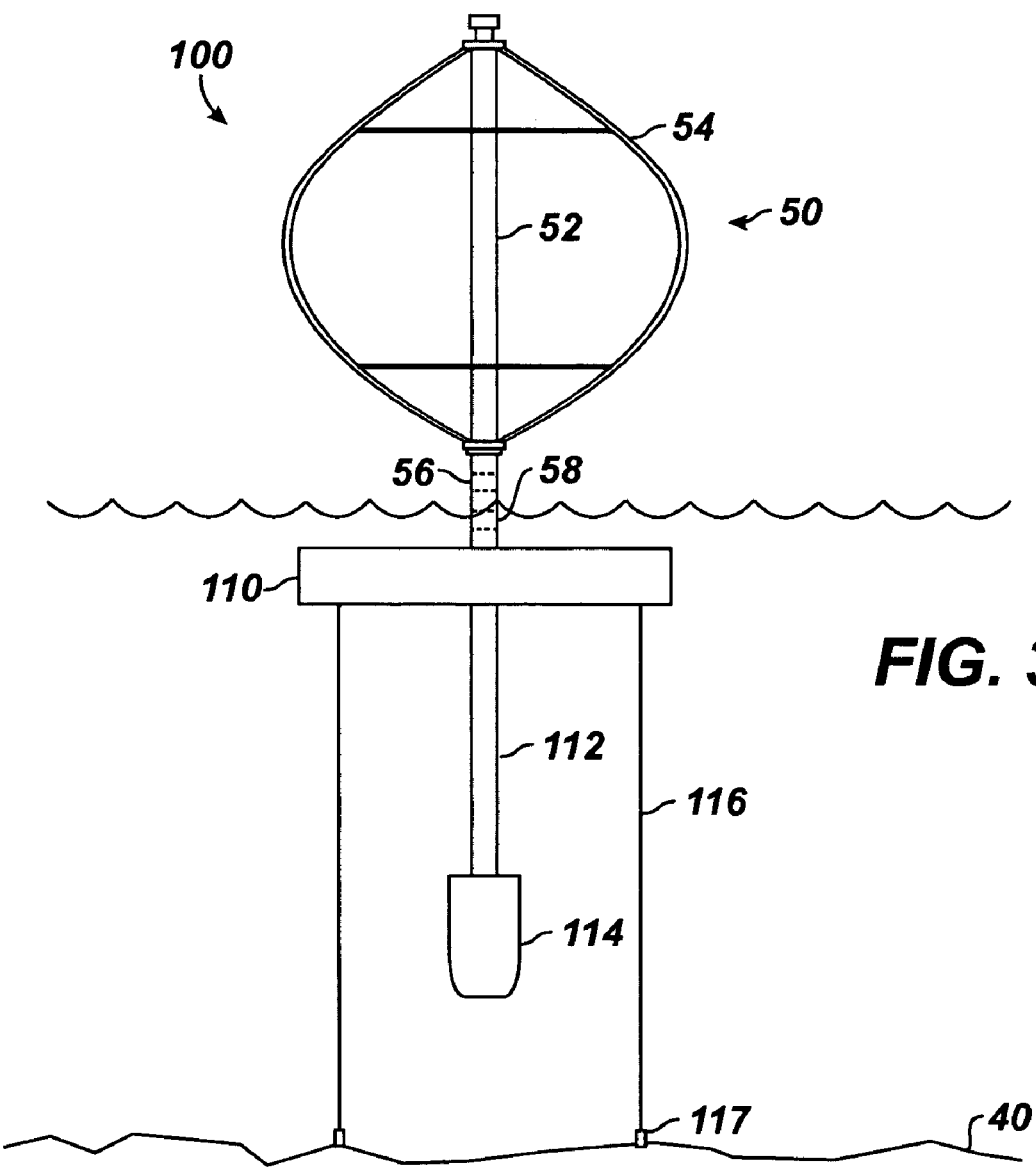
FIGS. 3A-3B show side and top views of a first embodiment of an offshore wind turbine having a vertical-axis wind turbine and having a counterweight for deeper waters.

Embodiments of offshore wind turbines disclosed herein preferably comprise vertical-axis wind turbines (VAWTs) mounted on platforms. The VAWTs can be Darrieus-type with or without guy cables and can be mounted on floating or fixed platforms. The VAWT has a vertical rotor with curved or straight blades coupled to a gearbox and an electric generator. Alternatively, the VAWT can have a direct-drive generator without the gearbox. The vertical rotor can fixedly extend from the floating or non-floating platform or may be tilted down to rest on the platform either manually or automatically. The platform is preferably buoyant so it can be floated to a desired destination offshore and towed back to the service beach for repairs and maintenance.

For deeper water, the platform can be a semi-submersible barge with the VAWT extending out of the water and with a counterbalance extending below the platform to counterbalance the wind force against the wind turbine. For shallower water that will not accommodate the vertical extent of a counter balance, the platform can float on the water's surface like a barge. Preferably, the barge is heavy and constructed with low-cost reinforced concrete. To minimize the use of materials, the barge is preferably not rectangular or circular shape and instead has a cross-shape or star-shape with three or more arms. For example, the barge is preferably constructed with extended horizontal reaches to fasten guy cables, to counter-balance the wind force against the wind turbine, and to keep the platform stable. In addition, to extend its horizontal reaches, each of its arms can have a horizontal extender with a flotation tank at its end to increase stability.

For even shallower waters near shore, the VAWT on a floating platform can be built with heavy but low-cost materials, such as reinforced concrete, and can be built and assembled on the beach, pushed into the sea, and towed to the site. By filling its flotation tanks with water, the floating platform can be lowered into the water to rest directly onto the seabed, lake bed, or river bed. In this way, the platform can serve as a fixed platform or foundation for the VAWT during normal operation, while the vertical rotor and blades of the VAWT extend above the water's surface. The platform can be re-floated by pumping the water out of the flotation tanks so the VAWT and platform can be towed back to the beach for repairs and maintenance. The ability to refloat the platform and tow it for repairs can greatly reduce the cost of assembly, installation, repairs, and maintenance when compared to performing these activities at sea.

Various anchoring systems can be used for anchoring the platforms intended to float on or near the water's surface, including the catenary anchoring system and the tension-leg anchoring system that are often used in the offshore industry for anchoring oil and gas drilling and production floating platforms. Some of these anchoring systems can have weights and pulleys that anchor the platform to the seabed but allow the floating wind turbine to adjust passively to changes in sea level due to tidal variations or storm swells. In some embodiments, the anchoring systems do not rigidly affix the platforms to the seabed, but instead merely rest on the seabed, which eases installation and removal of the VAWTs.

Figure 3B:
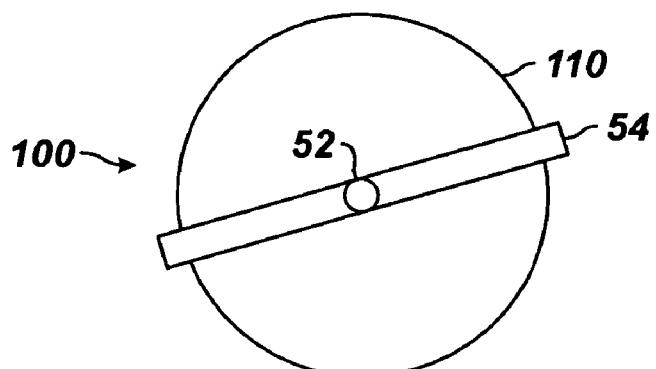

A. First Embodiment of Floating Wind Turbine Having Counterweight for Deeper Water A first embodiment of an offshore wind turbine 100 illustrated in FIGS. 3A-3B has a vertical-axis wind turbine (VAWT) 50 of the Darrieus type, although other types could be used. The VAWT 50 has a vertical rotor 52, a plurality of curved blades 54, a gearbox 56, an electric generator 58, and internal electrical components (not shown)-each of which can be essentially the same as those used with land-based VAWTs known in the art.

The offshore wind turbine 100 has a floating platform 110 that supports the VAWT 50 in the water. In general, the VAWT 50 mounted on the floating platform 110 can be a cantilevered system or can be held up with guy-cables. As shown, the floating platform 110 can be submerged below the surface of the water so that, under normal operating conditions, the platform 110 can hold the VAWT's blades 52 above the water level to catch the wind.

A central post 112 with a counterweight 114 extends below the platform 110 to balance the turbine 100 and to keep the rotor 52 oriented relatively vertically out of the water. This counterweight 114 counterbalances against the moment of the wind force F over the wind turbine 100 having height H that tends to tilt the wind turbine 100. To minimize the tilting by the wind, the counterweight 114 having a weight W and extending a length L below the platform 110 should be designed in such a way that W×L is at least greater than F×H.

The platform 110 can having either a hollow or a solid construction and can be constructed using various materials. For example, the platform 110 can be a shell made of composite, fiberglass, metal, concrete, or other material and can be filled with air or ballast material. In general, the floating platform 110 can be a barge or a semi-submersible and can have extended horizontal reaches to increase its stability. To minimize the use of material, for example, the platform 110 may not be of a rectangular or cylindrical shape and can instead have expanded horizontal extents to increase its stability. In this way, the platform 110 can have a cross or star-shape with 3 or more arms to provide support in the water.

Although usable in various depths of water, this offshore wind turbine 100 is suitable for use in deeper waters offshore having depths greater than 30 meters, for example. When deployed, the turbine's platform 110 can be anchor to the seabed 40 using any number of available anchoring systems known in the art. For example, the anchoring system can be a catenary anchoring system or a tension-leg anchoring system that is used for the floating platforms for offshore oil and gas drilling and production. As shown, a plurality of cables 116 and fasteners or mooring anchors 117 directly affix the platform 110 to the seabed 40 according to a taut leg mooring arrangement, but a catenary or other mooring arrangement could be used. In general, the cables 116 can be chain, steel wire rope, synthetic fiber rope, etc., and the fasteners or mooring anchors 117 can be drag embedded anchors, piles, suction anchors, or any other type of mooring anchor known in the art. The floating platform 110 is anchored at three or more points to the seabed at three or points to prevent it from rotating. Details of different anchoring systems that can be used with embodiments of the present invention are disclosed later herein.

The offshore wind turbine 100 does not suffer from some of the problems associated with offshore HAWTs known in the art. As discussed previously, offshore HAWTs must be oriented relative to wind direction and must be rigidly constructed and stabilized to support the rotor, blades, and tower above the water level. By contrast, the blades 54 of the VAWT 50 do not need to be oriented toward the wind's direction, and the VAWT's rotor 52 and blades 54 can be constructed mainly of composites or other lightweight, corrosion-resistant materials. In addition, the rotor 52 and blades 54 can be built with a low profile over the water so that the offshore wind turbine 100 can have a lower center of gravity—unlike offshore HAWTs that must support the heavy rotor, blades, gearbox, generator, and tower high above the water. At the height of 50 meters, for example, the wind over the sea may be significantly greater than the wind over land, so the VAWT 50 on the offshore wind turbine 100 can have greater energy output than its land-based counterparts. In summary, the offshore wind turbine 100's low center-of-gravity, omni-directional, and lightweight construction make it easier to stabilize and support in the water with a low-cost floating platform.

Figure 4A:
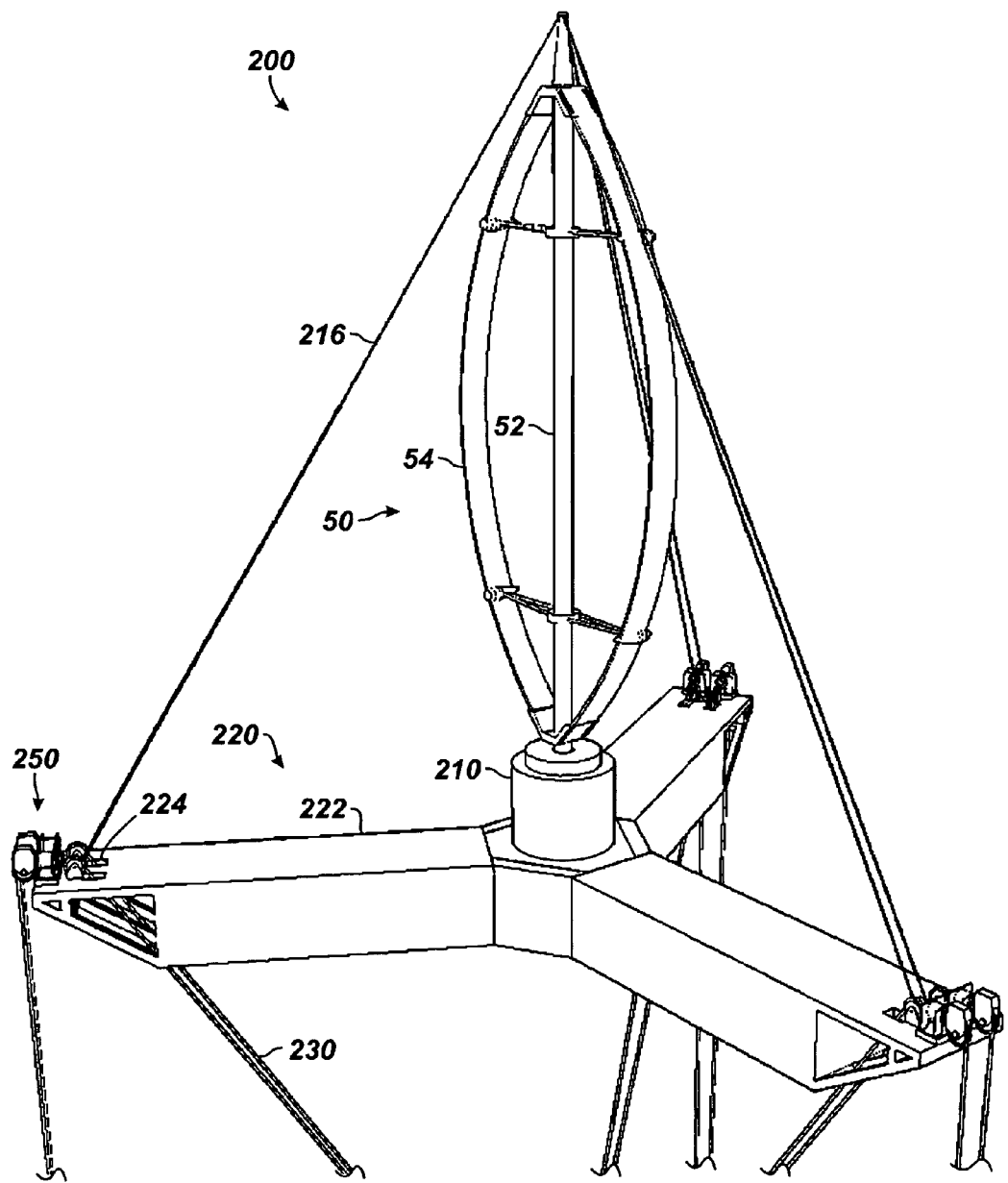
FIGS. 4A-4B show upper and lower perspective views of a second embodiment of an offshore wind turbine for shallower waters.
Figure 4B:
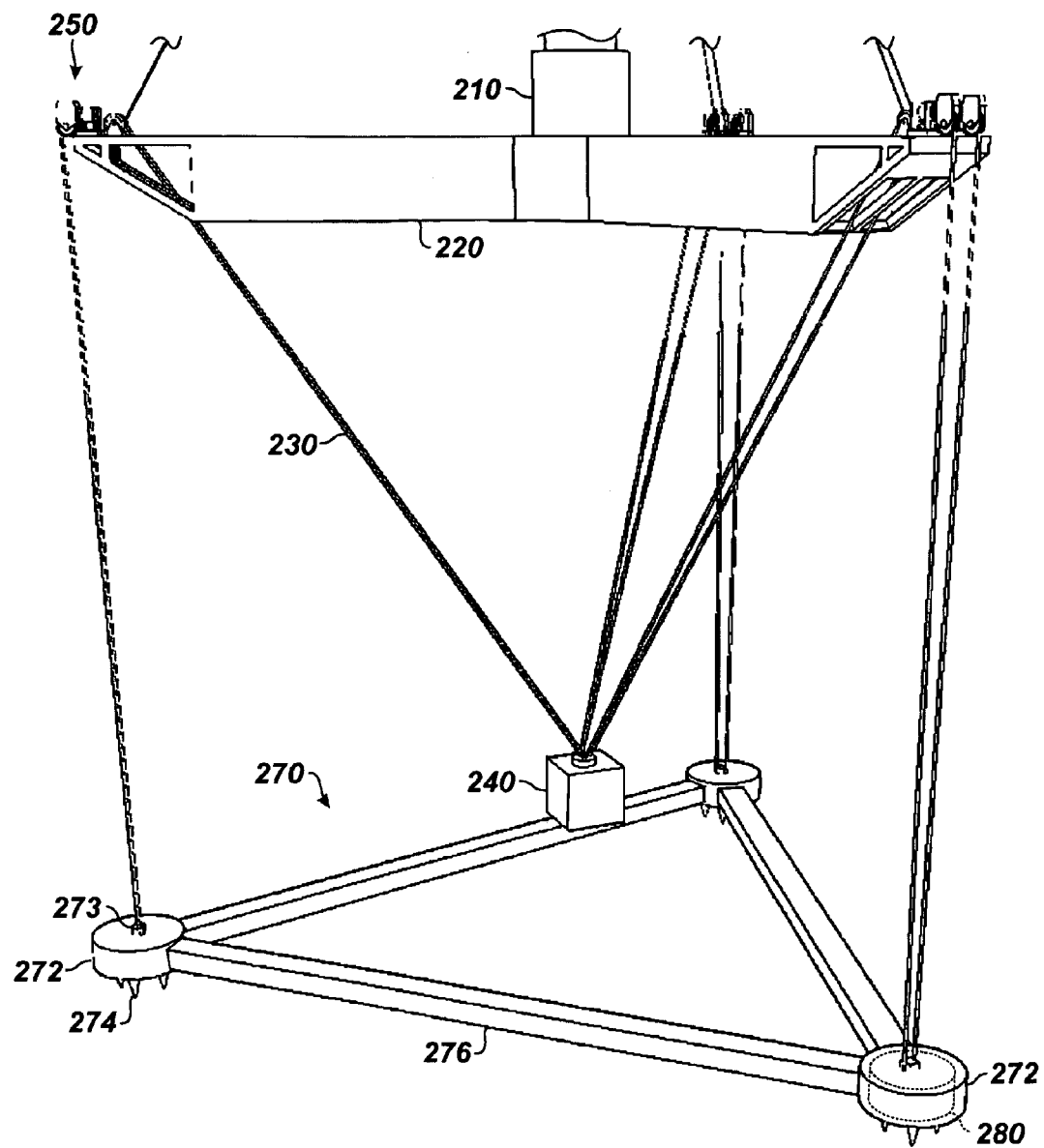

B. Second Embodiment of Floating Wind Turbine Having a Platform With Three or More Extended Arms and a Portable Anchor A second embodiment of an offshore wind turbine 200 is illustrated in FIGS. 4A-4B. As shown in FIG. 4A and similar to the previous embodiment, the offshore wind turbine 200 has a VAWT 50 with a rotor 52, curved or straight lifting blades 54, a gearbox (not shown), an electric generator (not shown), or a direct-drive generator without a gearbox, and other conventional components. In this embodiment, however, the rotor 52 and blades 54 extend from a stand 210 mounted on the surface of a floating platform or barge 220. This platform 220 can be made of heavy but low-cost materials, such as reinforced concrete, to enhance its stability over water. In addition, the platform 220 can have extended horizontal reaches, with three or more extended arms, to further increase its stability as well as serving as a platform for the guy-cables to fasten to. (The stand 210 may house the gearbox, electric generator, or a direct-drive generator without the gearbox and other conventional components). Guy cables 216 extend from the platform 220 to the top of the rotor 52 to stabilize the assembly. By using these guy cables 216, the rotor 52 and blades 54 can be made of lightweight material and can mount close to the platform 220, giving the offshore wind turbine 200 a low profile and a low center of gravity.

The platform 220 is intended to float on the water's surface during normal operation, and the offshore wind turbine 200 may be deployed in offshore regions of about 15 to 200 meters, for example. In general, the platform 220 has a plurality of arms 222 arranged symmetrically about the rotor 52, and in this implementation has three arms 222, although any number of arms could be used. The arms 222 gives the platform 220 a relatively large expanse while reducing the amount of material needed to construct the platform 220 if, for example, the platform 220 were constructed to have a square or circular footprint. Preferably, the expanse of the platform 220 is at least 1.5 times the height of the VAWT 50.

Not only does the platform 220 have a large expanse, the platform 220 also preferably has a greater weight than the VAWT 50 that it supports. For example, the weight ratio between the platform 220 and the VAWT 50 may be at least 50 to 1. In one implementation, the platform 220 may weigh 1000 metric tons, while the VAWT 50 may weigh 20 metric tons. Preferably, the floating platform 220 is composed of laminated or reinforced concrete and can be constructed using conventional techniques for making floating platforms in the offshore oil and gas industry or the like. Constructed in this manner, the platform 220 can have a concrete shell enclosing air, expanded polystyrene, or other ballast medium inside, and the shell can contain a number of inner chambers or divisions.

Constructed in the above manner, the platform 220 can be a heavy floating surface barge made of low-cost materials, such as reinforced concrete with floatation tanks. The floating surface barge 220 preferably has its center of buoyancy higher above its center of gravity by a distance D so the barge 220 may be stable in high waves. To minimize the tilting of the VAWT 50 having a height H at its maximum diameter by a wind force F, the weight W of the barge 220 is preferably heavy enough so that W×D is much greater than F×H. In addition, the floating barge 220 can have extended horizontal reach to increase its stability, as well as to provide a base for fastening the guy-cables 216 of the VAWT 50 as shown in FIG. 4A. To minimize the materials required, the low-cost barge 220 can be of cross-shape or of star-shape with 3 or more arms, as shown in FIG. 4A. The low-cost, heavy floating barge 220 can also be used to support HADT or HAWT (not shown) with or without guy-cables.

Each end of the platform's arms 222 includes a pair of pulley systems 250, and a number of anchor cables 230 pass through openings 224 in the ends of the platform's arms 222 and through these pulley systems 250. As shown in FIG. 4B, first ends of these anchor cables 230 connect to an underwater weight 240 supported below the platform 220 and the surface of the water when deployed. This weight 240 can be composed of reinforced concrete and can way about 300-500 tons. The opposite ends of the anchor cables 230 connect to a portable anchor 270 that rests on the seabed when deployed. Dual arrangements of these pulley systems 250 and cables 230 are used on each of the platform's arm 222 for redundancy purposes, but other implementations could uses a single pulley system 250 on each arm 222.

As shown, the anchor 270 can have a triangular shape that mirrors the three arms of the platform 200, although this may not be strictly necessary. In particular, the anchor 270 has three feet 272 interconnected to one another by cross beams 276. The feet 272 have connectors 273 on top for coupling to the anchor cables 230 and have cleats 274 on the bottom surface for engaging the seabed when positioned under water. These feet 272 may have hollows 280 allowing the anchor 270 to float when being towed. Although several techniques can be used to deploy the platform 220, weight 240, and anchor 270 offshore (as disclosed in more detail below), operation of the anchor 270 and weight 240 once deployed allow the platform 220 to move up and down relative to the seabed, as also discussed in more detail later. This ability permits the platform 220 to passively adjust to changes in sea level due to tides or storm swells.

C. Pulley Systems for Platforms

FIGS. 5A-5B show respective top-down and cross-sectional views of the ends of the flotation platform's arms 222, revealing further details of the pulley systems 250. Each of these pulley systems 250 has a first pulley 252 mounted on the platform 220 adjacent the opening 224 for a cable 230. Coming from the submerged weight (240; FIG. 4B), the cable 230 passes through the opening 224 and over this first pulley 252 to a directing funnel 254. The funnel 254 directs the cable 230 to a second pulley 258, and the cable 230 passes over this second pulley 258 to the submerged anchor (270; FIG. 4B) on the seabed below. This second pulley 258 is mounted on a head 256 rotatably connected to the directing funnel 254 so the second pulley 258 can pivot relative to the directing funnel 254. In this way, the cable 230 can remain on the pulleys 252/258 while the second pulley 258 rotates during any tilting of the platform 220 in the water.

Construction of portion of the platform 220 is also shown in FIG. 5B. In particular, the platform 220 as shown has an outer shell 221 composed of laminated or reinforced concrete and has an inner chamber 223. The pulley systems 250 are supported on a toe extending from this shell 221. The shell's inner chamber 223 can be filled with air, expanded polystyrene, or any suitable ballast medium and can have divided chambers or other divisions therein.

Figure 6A:
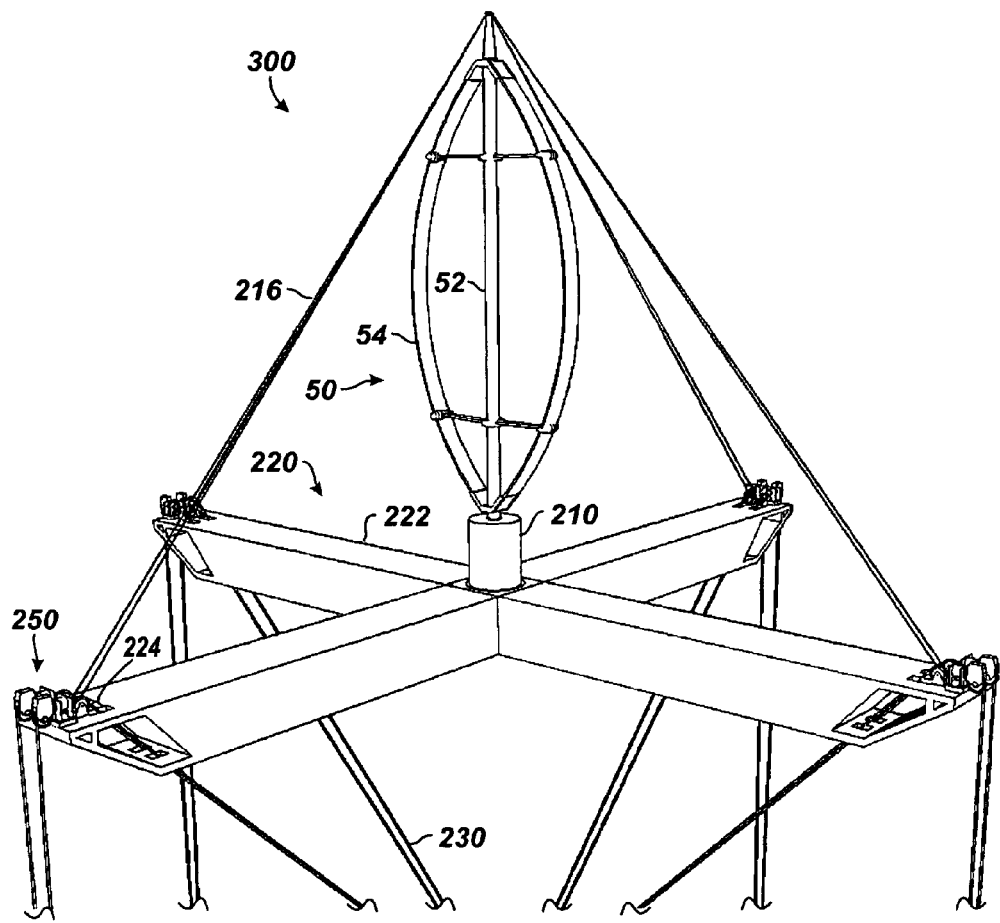
FIGS. 6A-6B show upper and lower perspective views of a third embodiment of an offshore wind turbine.
Figure 6B:
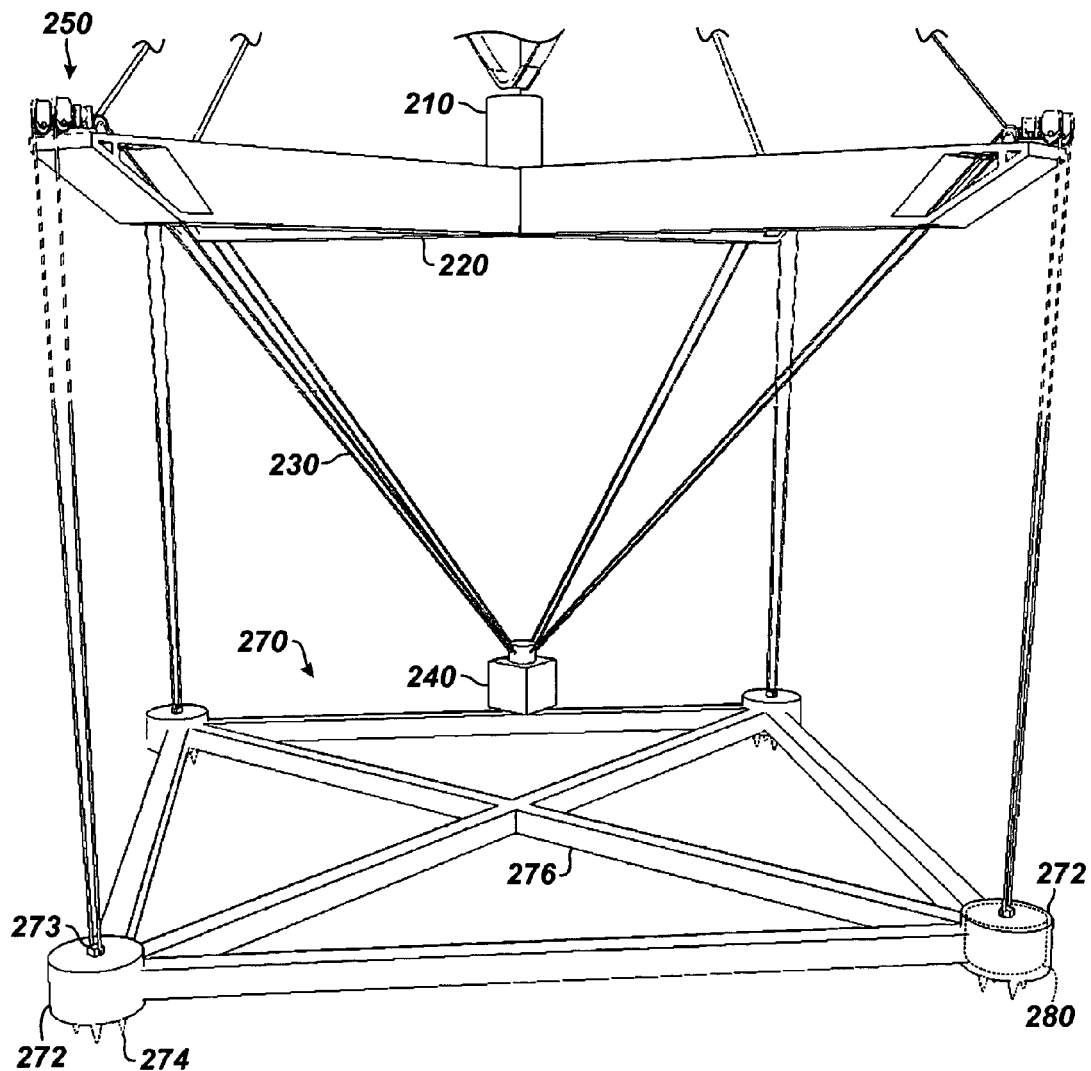

D. Third Embodiment of Floating Wind Turbine Having Four Arms, Weight, and Anchor A third embodiment of an offshore wind turbine 300 shown in FIGS. 6A-6B is similar to the offshore wind turbine 200 of FIGS. 4A-4B so that like reference numerals are used for similar components. Again, this offshore wind turbine 300 may be suitable for deployment in water having a depth of about 10 m to 50 m and can be deployed in a similar manner to the offshore wind turbine 200 of FIGS. 4A-4B. In this embodiment of the offshore wind turbine 300, the platform 220 has four arms 222 as opposed to only three. Having four arms 222 with each having dual guy cables, the turbine 300 may be better able to handle inclement weather such as hurricanes or typhoons. As shown in FIG. 6B, the portable anchor 270 used with this offshore wind turbine 300 preferably has four feet 272 in a square pattern interconnected by various cross beams 276 to mirror the shape of the platform 220. These feet 272 may also have hollows 280 allowing the anchor 270 to float when being towed.

E. Fourth Embodiment of Floating Wind Turbine for Shallow Waters Near Shore

Figure 7A:
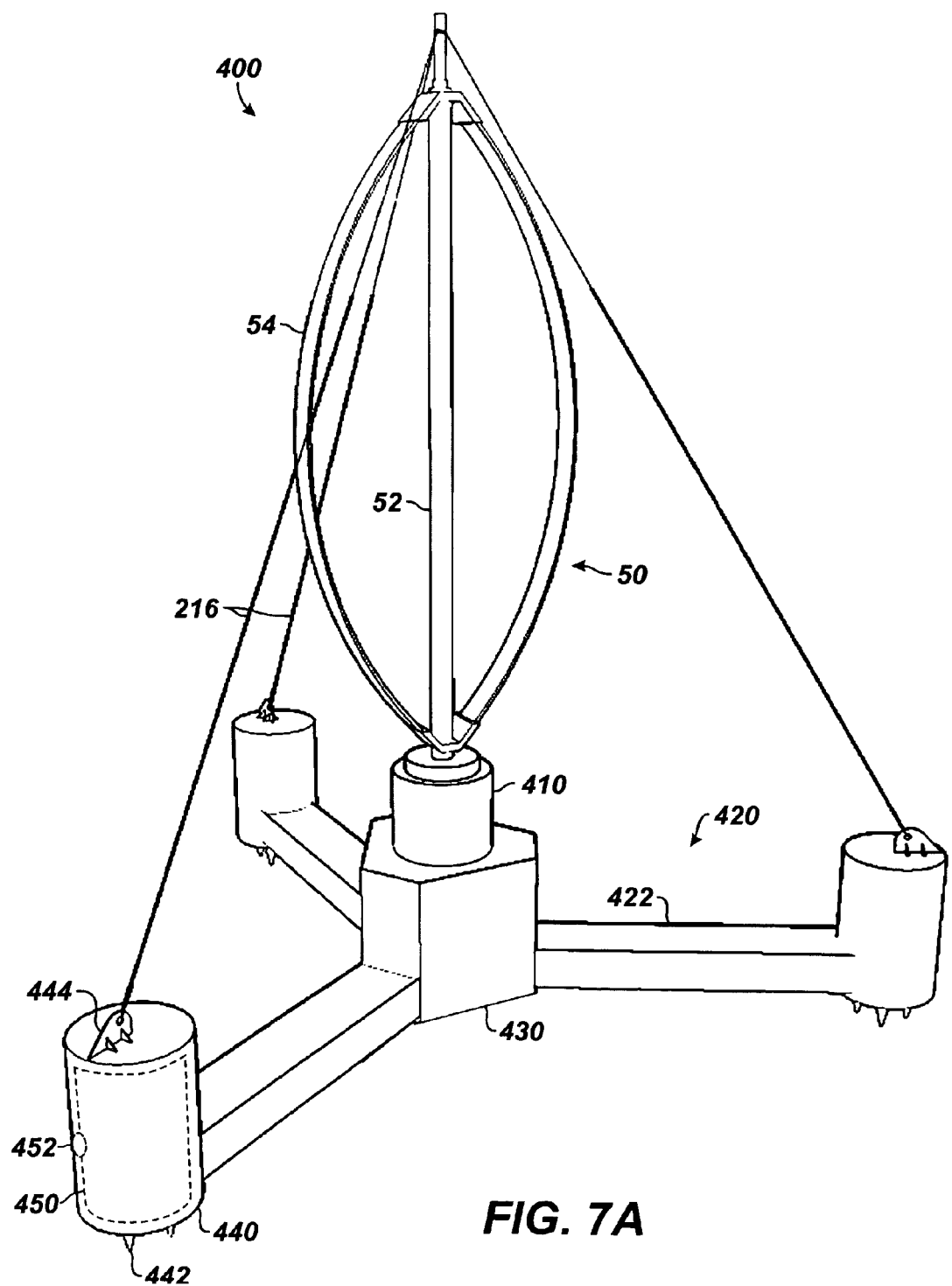
FIG. 7A shows a perspective view of a fourth embodiment of an offshore wind turbine having a submersible floating platform.

A fourth embodiment of an offshore wind turbine 400 illustrated in FIG. 7A is suitable for deployment in shallow waters of a depth up to 15 meters that may exist near a shore line. Again, this offshore wind turbine 400 has a VAWT 50 with a rotor 52, curved blades 54, and other conventional components. The rotor 52 mounts on a short stand 410 that can house some of the conventional components, and guy cables 216 stabilize the rotor 52 to the platform.

The short stand 410 in turn rests on a submersible floating platform 420 intended to rest on the seabed in shallower waters near shore. This platform 420 has a central member 430 supporting the stand 410 and VAWT 50 and has a plurality of toes 440 interconnected to the central member 430 by cross beams 422. The platform 420 is preferably composed of reinforced concrete and has a weight much greater than the relatively-lightweight VAWT 50. The platform's toes 440 have cleats 442 on their bottoms for engaging the seabed and have turrets 444 on their tops for connecting to the guy cables 216.

Although shown with guy cables 216 extending from the platform's toes 440 in FIG. 7A, the guy cables 216 extending from the VAWT's rotor 52 can be connected to the seabed as shown in FIG. 7B using pipe anchors 460 or the like. When the wind turbine 400 is deployed, a temporary bracket and support bars are preferably used to support the rotor 52 to the platform 420 because the guy cables 216 will not yet be installed. Once the platform is submerged to the seabed, the temporary bracket and support bars can be removed, and the guy cables 216 and pipe anchors 460 can be installed to support the rotor 52. When two such wind turbines 400 are deployed adjacent one another on the seabed, the adjacent VAWTs 50 on the adjacent platforms 420 may share one or more the pipe anchors 460 to support their rotors 52.

Although shown with the VAWT 50, the wind turbine 400 can alternatively have a horizontal axis wind turbine (HAWT) 40 as shown in FIG. 7C or a downwind horizontal axis wind turbines (HADT) 45 mounted on the platform 420. Both the HADT 40 and HAWT 45 can have a rotor 42, blades 44, and tower 46 and can be supported on the floating platform 420 with or without guy cables (not shown). If guy cables are used, they can connect the tower 46 to the platform 420 or to the seabed.

As shown in FIGS. 8A-8B, the offshore wind turbine 400 can be constructed in stages on the beach near the shore line 42. In stages A, B, and C, for example, assemblers construct the submersible platform 420, tower 410, rotor 52, and blades 54 as the assembly is pushed toward the shoreline 42 along rails, rollers, or the like 46. As stage D, the turbine 400 is pushed into the water and floated to its shallow location. Finally, at stage E, the submersible platform 420 can be sunk in the water to rest on the seabed 40 so the rotor 52 and blades 54 can extend from the water to catch the wind.

To float the submersible platform 420 on the water in stage D, temporary floatation devices (not shown), such as buoys and cables, can be coupled to the submersible platform 420 to float it to a desired location near shore, where the submersible platform 420 can then be lowered to the seabed 40. Alternatively, the submersible platform 420 can include hollows inside that allow it to float.

As shown in FIG. 7A, for example, each toe 440 and the central member 430 can define hollows 450. These hollows 450 can be lined tanks with one or more valves 452. Regardless, these internal hollows 450 filled with air allow the offshore wind turbine 400 to float on the water so it can be towed to and from a site near the shore. When the hollows 450 are filled with water, however, the offshore wind turbine 400 sinks in the shallow water, and the cleats 442 on the toes 440 engage the seabed while the rotor 52 and blades 54 extend vertically from the water, as ultimately shown in stage E of FIGS. 8A-8B.

As shown in FIG. 8C, the wind turbine 400A may be deployed on a relatively flat area of seabed 40 so that the platform 420A can rest level and the rotor 52 extend vertically from the water. Because the seabed 40 may not be perfectly flat and horizontal in the desired location, the offshore wind turbine can be modified for the particular location where it is to be used so the rotor 52 will extend vertically from the water's surface. As shown by the wind turbine 400B, for example, the submersible platform 420B can be constructed with one or more of its toes 440B angled off plane from the other toes so that the submersible platform 420B can be mounted at a predetermined orientation on the unlevel seabed 40 so the rotor 52 can extend vertically.

As shown by the wind turbine 400C in FIG. 8C, operators can use surveys of the seabed 40 in the desire location and can construct the rotor 52 and/or stand 410 with a tilt at a designated angle so that rotor 52 will extend vertically from the water's surface when the submersible platform 420B rests on the unlevel seabed 40. Alternatively, the connection between the rotor 52 to the stand 410 or the stand 410 to the submersible platform 420C can be adjustable with a hinge mechanism or the like (not shown) so that the rotor 52 can be corrected (tilted) to extend vertically should the offshore wind turbine 400 be deployed on an unlevel seabed that is less than ideally horizontal and flat.

Although the offshore wind turbine 400 is illustrated in connection with a VAWT 50, its more rigorous construction, and use of a non-floating submersible platform 420, allows this design to be modified to include a horizontal axis wind turbine (e.g., a HAWT) as well. However, use of a HAWT in the turbine 400 of FIGS. 7 and 8A-8C is not shown for simplicity.

F. Fifth Embodiment Having Extendable Toes and Other Features

Figure 9A:
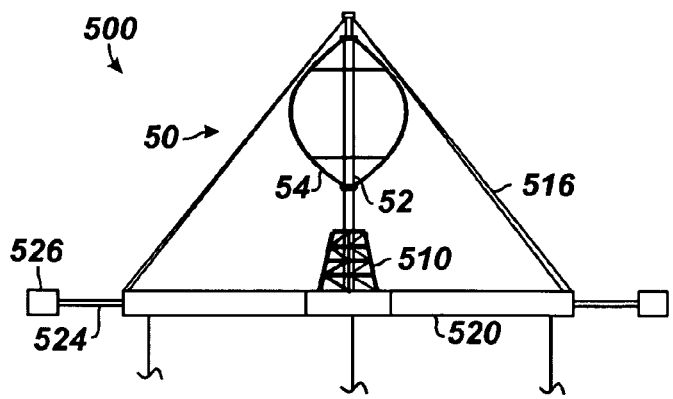
FIGS. 9A-9B show side and top views of a fifth embodiment of an offshore wind turbine having extendable toes.
Figure 9B:
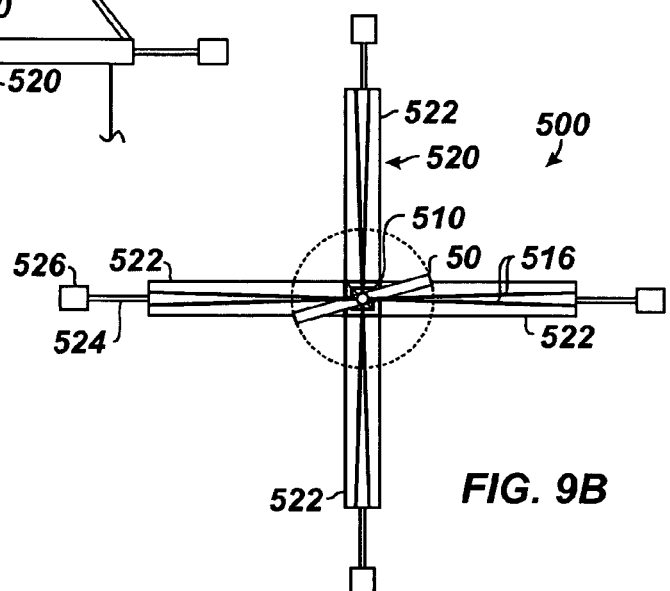

A fifth embodiment of an offshore wind turbine 500 is illustrated in FIGS. 9A-9B. As with previous embodiments, the offshore wind turbine 500 has a VAWT 50 with a rotor 52, curved blades 54, a gearbox (not shown), an electric generator (not shown), and other conventional components. The offshore wind turbine 500 also has a floating platform 520 with four arms 522 intended to float on the surface during normal operation to support the rotor 52 vertically above the water. As shown, a short tower 510 supports the rotor 52 on the platform 520, and a plurality of guy cables 516 connect the distal end of the rotor 52 to edges of the platform 520 to provide extra stability for the rotor 52.

For additional stability, extendable toes 524 on ends of the arms 522 can carry floatation elements 526 to further increase the platform's expanse on the surface of the water and to further increase the platform's stability and buoyancy. These toes 524 and floatation elements 526 can be extended using motors after the offshore wind turbine 500 has been moved to a desired offshore location and is ready for operation.

G. Sixth Embodiment of Floating Wind Turbine Having Reclinable VAWT

The offshore wind turbines (e.g., 100, 200, 300, 400, and 500) of the present disclosure can have VAWTs 50 that are rigidly supported on the turbine's platform to always extend vertically therefrom. Alternatively, the VAWT 50 may be designed to recline on the platform, which can help when towing the offshore wind turbine or to protect the VAWT 50 during high wind conditions.

Figure 10:
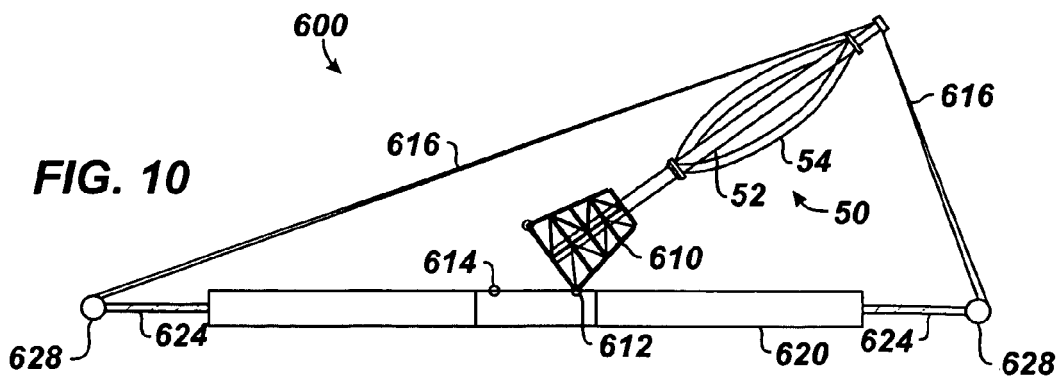
FIG. 10 shows a side view of a sixth embodiment of an offshore wind turbine having reclining rotor and blades.

For example, FIG. 10 shows an offshore wind turbine 600 having a VAWT 50 capable of being reclined and raised on the turbine's platform 620. A hinged coupling 612 at one edge of the tower or stand 610 and a releasable coupling 614 at an opposite edge couple the VAWT 50 to the platform 620. When transporting the offshore wind turbine 600 or when strong winds occur, the tower 610 can be decoupled at coupling 614 and pivoted (tilted) about the hinged coupling 612 to recline the VAWT's rotor 52 and blades 54 on the platform 620. Similarly, raising the VAWT's rotor 52 and blades 54 involves pivoting (tilting) the rotor 52 about hinged coupling 612 and recoupling the tower 610 at coupling 614 to secure the rotor 52 in its vertical position on the platform 620.

Reclining and raising the VAWT 50 on the platform 620 can be done manually or can be performed remotely and automatically. For example, either temporary or permanent winches 628 on the platform 620 can recline the VAWT 50 before an approaching storm. Operators can mount such temporary winches 628 on the platform 620, lower the VAWT 50, and move the temporary winches 628 to another offshore wind turbine. Alternatively, remote transmissions from shore or a nearby vessel can actuate the releasable coupling 614 and can operate winches 628 permanently mounted on the platform 620 (or on extendable toes).

In either case, the winches 628 when operated use the guy cables 616 to pivot the rotor 52 on the hinged coupling 612 to either raise or lower the VAWT 50. For example, the VAWT 50 can be lowered to lay flat on the floating platform 620 by adjusting the length of two opposite sets of dual guy-cables 616 with the remotely controlled winches 628, while the other two sets of opposite dual guy-cables (not shown) remain taught. In this way, if storm winds occur in the area of the offshore wind turbine 600, operators can remotely recline the VAWT 50 to prevent damage and minimize the impact of the strong wind and waves on the VAWT 50. After the strong winds have passed, operators can then raise the VAWT 50. The winches 628 used can be mounted directly on the platform 620 or can be mounted on extensions 624 that are extend from the platform 620.

H. Modular Platform Construction

As discussed previously, the platforms used with the various embodiments of the offshore wind turbines (e.g., 100, 200, 300, 400, and 500) disclosed herein can be composed of any suitable material, such as laminated or reinforced concrete, and can be composed as a shell filed with air or ballast material. In addition, the disclosed platforms, such as platforms 220 of FIGS. 4A and 6A, can be constructed as one unit or one piece. Alternatively, the disclosed platforms can have a modular construction.

Figure 11:
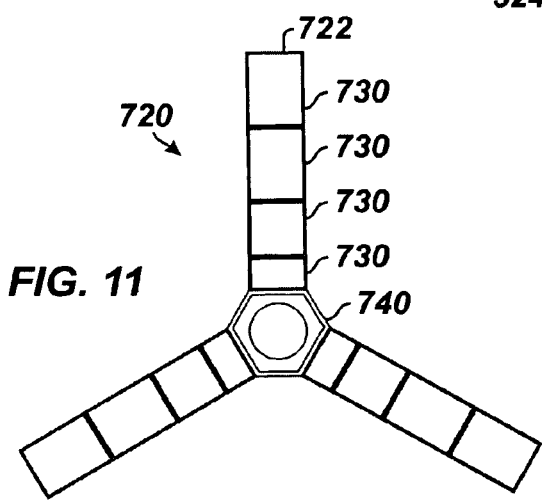
FIG. 11 is a top view showing a modular floating platform for use with the disclosed offshore wind turbines.
Figure 12:
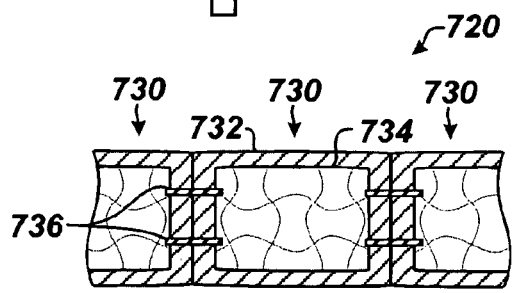
FIG. 12 shows a cross-sectional view of floatation elements for the modular floating platform of FIG. 11.

As shown in FIG. 11, for example, a modularly constructed platform 720 has a plurality of interconnected floatation elements 730 attached together in a desired arrangement, which in this example is a three-arm shape. A central flotation element 740 is shown at the center of the three arms for supporting the VAWT (not shown). The platform 720's modular construction using the flotation elements 730 makes the manufacture and assembly of the platform 720 inexpensive and relatively easy. These floatation elements 730 can be composed of any suitable material and can have a hollow or solid construction as disclosed herein. In FIG. 12, for example, the floatation elements 730 have a concrete shell 732 filled with a core 734 composed of expanded polystyrene or other ballast material. These filled shells 732 can be bolted, tied, or otherwise fastened together end-to-end and side-to-side using connectors 736, such as bolts, cables, rods, etc., either installed internally as shown or applied on their surfaces.

I. Deployment and Assembly of Floating Wind Turbine

Details for assembling and deploying the shallow water offshore wind turbine 400 of FIG. 7A have been discussed previously with reference to FIGS. 8A-8C. The VAWTs 200 and 300 of FIGS. 4A-4B and 6A-6B having platforms 220 and anchors 270 require different assembly and deployment steps-some of which are shown in FIGS. 13A-13C. In these exemplary steps, the offshore wind turbine being assembled is the three-armed offshore wind turbine 200 of FIGS. 4A-4B, although the same steps may apply to the four-armed offshore wind turbine 400 of the FIGS. 6A-6B. Assembly of the turbine 200 can be performed right on the beach 42 as shown in FIG. 13B, or the assembly can be performed on a dock 44 with a ramp extending into the water, as shown in FIG. 13C.

In a first assembly stage A, assemblers construct the platform 220 and anchor 270 adjacent one another. Moving the assemblies along rails, rollers, or the like 46 towards the shoreline 42, assemblers then add the stand 210 to the platform 220 and install the rotor 52, blades 54, and other components of the VAWT 50 as the assemblies are moved closer to the shoreline in stages B, C, and D.

At stage E, assemblers float the anchor 270 and the platform 220 in the water. As noted previously, the platform 220 is intended to float in the water, while the anchor 270 when deployed is intended to rest on the seabed 40. To float the anchor 270, temporary floatation devices (not shown), such as buoys, coupled to the anchor 270 can be used. Alternatively, as shown in FIG. 4B, the anchor 270 can include hollows 280 in its feet 272 that allow the anchor 270 to float. These hollows 280 can be lined tanks with one or more valves (not shown) that can be flooded or evacuated to allow the anchor to sink or float. Alternatively, these hollows 280 can simply be open bottoms in the feet 272 that can trap air allowing the anchor 270 to float and that can be flooded with water allowing the anchor 270 to sink. In either case, the anchor 270 can float on the water and be sunk to the seabed 40 where desired. These and other possibilities can be used. At stage F, assemblers then deploy the anchor 270 to the seabed 40 at a deployment site.

Several techniques can be used to tow the platform 220 and anchor 270 to the deployment site where the anchor 270 can be lowered to the seabed 40. In a first technique, the platform 220 and anchor 270 are floated next to one another on the surface of the water and towed together to the deployment site. Assemblers then sink the anchor 270 to the seabed 40 by filling the hollows 280 in its feet. Specifically, assemblers flood one foot 272 of the anchor 270 so that it touches the seabed 40, and then complete flooding of the other feet 272 so that the anchor 270 rests on the seabed 40. In sinking the anchor 270, assemblers attach floats to the cables 230 connected to the anchor 270 so the cables 230 can be retrieved at the water's surface. With the anchor 270 resting on the seabed 40, assemblers float the platform 220 over the submerged anchor 270, retrieve the floated cables 230, pass the cables 230 from the anchor 270 through the pulley systems 250, and connect the cables 230 to the weight 240. Finally, assemblers submerge the weight 240 below the platform 220 to tighten the cables 230 and finish the installation.

In a second technique, the anchor 270 can first be stacked below the platform 220 on land or in shallow water, and then the stacked anchor 270/platform 220 can be towed together to the deployment site on the water's surface. At the deployment site, assembler can reeve cables 230 to the anchor 270 from the platform 220 while lowering the anchor 270 to the seabed 40 with winches (not shown). This process may require a number of steps of sheaving, slacking, and tying off the cables 230 in stages around the platform 220. After placing stops on the cables 230, assemblers can connect the cables 230 on the winch to the weight 240 and lower the weight 240 under the platform 270 to take up the slack in the cables 230. Assemblers may finally release the stops and complete lowering the weight 240 below the platform 220 to complete the installation. With the offshore wind turbine 200 deployed, assemblers can then take the winches to another platform to repeat the deployment steps on another assembly.

Should the wind turbine 200 need repair, operators can use winches to bring the weight 240 up from below the platform 220, detach the cables 230 from the weight 240 and the pulley systems 250, and attach floats to the cables 230 so the anchor 270 can be relocated later. The detached platform 220 can then be towed to shore for repair. If the anchor 270 needs to be retrieved as well, operators can lift the anchor 270 from the seabed 40 with winches and then tow the combined platform 220 and anchor 270 to shore. Also, the hollows 280 in the anchor 270 can be filled with air to allow it to float as well.

J. Passively Adjustable Anchoring Systems

Figure 14A:
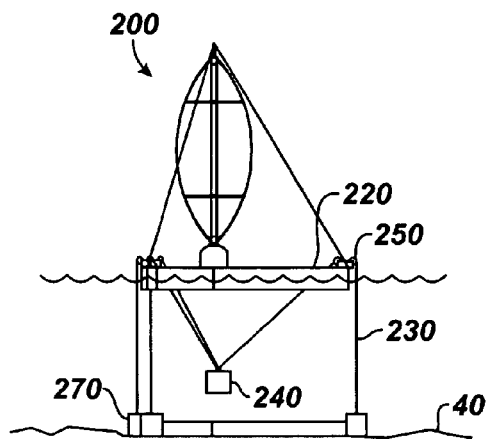
FIGS. 14A-14D show the anchoring system of FIGS. 4A-4B adjusting to different sea levels.
Figure 14B:
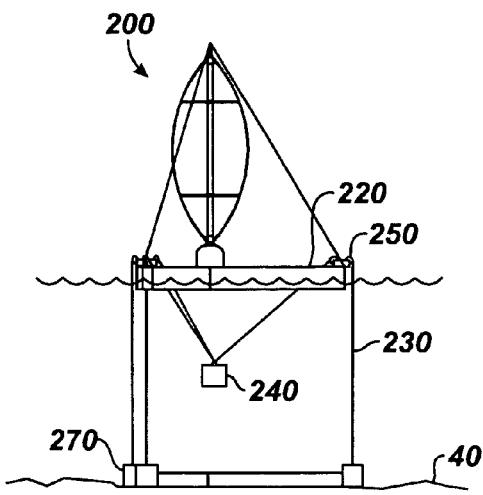
Figure 14C:
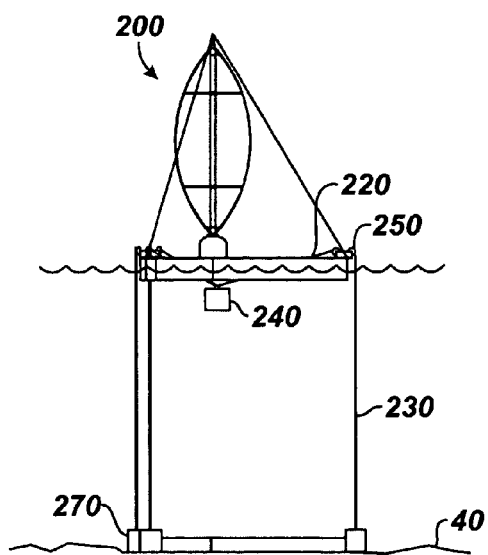
Figure 14D:
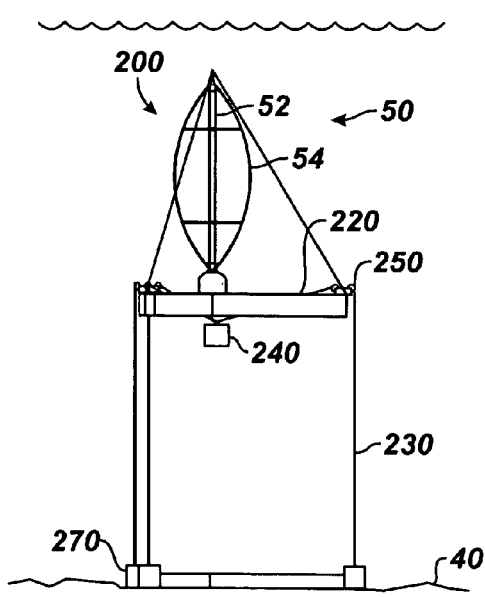

The offshore wind turbines 200 and 300 of FIGS. 4A-4B and 6A-6B have anchoring systems (i.e., cables 230, weights 240, pulley systems 250, and anchors 270) capable of passively adjusting to changes in sea level due to tidal variations or storm swells. Details of this passive adjustment are shown in FIGS. 14A-14D, in which the offshore wind turbine 300 of FIGS. 6A-6B is shown adjusting to the changes in sea level. When the sea level rises (FIGS. 14A to 14C) or lowers (FIGS. 14C to 14A), the platform 220 raises and lowers accordingly on the surface of the water while remaining anchored by the cables 230, weight 240, pulley systems 250, and anchor 270. Should a significantly large swell develop during a storm, the platform 220 lifts to the full extent of the anchor cables 230 as shown in FIG. 14C. If the sea level increases even further as shown in FIG. 14D, the sea level may even surpass the platform 220 and the VAWT's rotor 52 and blades 54, which would then remain at least partially submerged below the water level for protection during the storm or tidal wave.

In addition to the above anchoring system, the various embodiments of offshore wind turbines disclosed herein can use other passively adjustable anchoring systems, such as shown in FIGS. 15A-15C. The adjustable anchoring system 840A of FIG. 15A uses a plurality of pulleys 846 on the platform 820. Multiple anchor cables 844 pass through these pulleys 846 and interconnect separate weights 842 to separate anchors 848 in the seabed. It will be appreciated that the platform 820 may have several such anchoring systems 840A connected symmetrically around the platform 820 to anchor it to the seabed 40.

Another passively adjustable anchoring system 840B in FIG. 15B uses a common weight 843 with the multiple anchor cables 844, pulleys 846, and anchors 848. The passively adjustable anchoring system 840C in FIG. 15C likewise uses a common weight 843, but uses a single anchor cable 845 that passes through a pulley 847 on the weight 843 as well as through pulleys 846 on the platform 820. With the benefit of the present disclosure, it will be appreciated that other arrangements of weights, cables, pulleys, and anchors can be used to anchor the platforms 820.

K. Actively Adjustable Anchoring Systems

The various anchoring systems discussed previously act passively to raise or lower the platform with changes in the sea level. In additional embodiments, the floating wind turbines of the present disclosure can use actively adjustable anchoring systems capable of temporarily drawing the offshore wind turbine under the water's surface for protection during harsh weather conditions.

In FIGS. 16A-16B, for example, an actively adjustable anchoring system 840D has one or more mechanical winches 841 on the platform 820 that are coupled to anchor cables 846 anchored to the seabed 40 with anchors 848. These winches 841 can be operated to either raise or lower the offshore wind turbine 800 relative to the sea level using the anchor cables 846. In this way, the operated winches 841 can shorten the length of the cables 846 to pull the offshore wind turbine 800 below the water's surface when strong winds or high waves occur (FIG. 16B), and can then release the cables to allow the offshore wind turbine 800 to float at or near the surface after the winds or waves have passed (FIG. 16A). Although this winching system is shown used with the platform 820 intended to float on the water's surface and used with fixed anchors 848, the winching system could also be used with any of the various platforms and anchors disclosed herein, even though such alternatives are not illustrated.

The VAWT 50 can remain fixed in the vertical position on the platform 820 while drawn under the water's surface. Alternatively, as shown in FIG. 16B, the VAWT 50 can be reclined on the platform 820, as was illustrated in FIG. 10. With this arrangement, the VAWT 50 could be reclined on the platform 820 as high winds develop, and the entire offshore wind turbine 800 and platform 820 can be winched below the surface as shown in FIG. 16B for protection. By reclining the VAWT 50, the amount of winching needed to pull the offshore wind turbine 800 below the water's surface can be reduced.

L. Matrices of VAWTs

In a typical implementation, a large number of the disclosed wind turbines may be used in a wind farm matrix at an offshore location. The wind turbines can be anchored near one another and interconnected together by common electrical cables. In a first example, FIGS. 17A-17B shows just a portion of a wind farm matrix 900 having one arrangement for interconnecting multiple wind turbines. In this example, the matrix 900 uses the floating wind turbines 200 of FIGS. 4A-4B but could likewise use any other wind turbines disclosed herein, such as the non-floating wind turbines of FIGS. 7A-7D. In one implementation of the matrix 900, for example, each offshore wind turbine 200 can have a VAWT 50 with a 300-kW capacity that converts the wind at sea to electricity at low cost. In a strong wind region offshore with annual mean wind velocity of 9 meters per second, for example, each offshore wind turbine 200 may generate 1.0 million kWh of electricity per year.

In the matrix 900, power lines 952 connect the wind turbines 200 to power barges 950. In turn, these power barges 950 can connect to one another by power cables 954 as best shown in FIG. 17B. The power barges 950 receive power (i.e., current) from at least some of the floating wind turbines 200 to which they are connected, and communicate such power to a land-based station 956 or other power sink by one or more commonly shared cables 954.

To install the matrix 900 offshore, each offshore wind turbine 200 can be assembled, towed, and anchored into position using any of the methods previously discussed, and connected to the power grid (e.g., power barges 950) to generate electricity. Similarly, each offshore wind turbine 200 can be easily disconnected from the matrix 900 and towed back to the shore for repairs and maintenance without affecting the entirety of the matrix 900. In this regard, it can be of substantial benefit to use anchoring systems and methods that do not rigidly affix the offshore wind turbines 200 to the seabed. For example, in each of the embodiments of FIGS. 4, 6, and 7, anchoring systems are used that merely rest on the seabed 40, which allow these anchoring systems to be floated to allow for easy installation or removal of a particular offshore wind turbine from the matrix 900.

The power barges 950, like the platforms of the floating wind turbines, may float at or near the water's surface, and may be similarly constructed to the platforms of the floating wind turbines 200. Because the power barges 950 merely act as an electrical hub to which the floating wind turbines 200 can connect and need not carry significant hardware beyond conventional connectors and cabling (unlike the turbines 200), the barges 950 may not need to be anchored to the seabed 40 with the same degree of diligence as do the turbines 200. For example, and as shown in FIG. 17A, a barge 950 may only use a single cable 951 and anchor 948 that may not be capable of either passive or active adjusting the relative depth of the power barge 950. In another implementation, a barge 950 may not be anchored at all, and instead may rely merely on the power cables 952 to keep the barges 950 into proper position relative to the anchored floating wind turbines 200, assuming that suitably robust connectors (not shown) couple the power cables 952 to the power barges 950. In any event, the barges 950 may lack an anchor, have their own anchors, connect by cables to the anchors of the offshore wind turbines 200, or use any of the various anchoring systems disclosed herein.

In another arrangement shown in FIG. 18, the matrix 900 can connect to a nearby offshore platform 970 to communicate power to the platform 970 or some other power sink. For example, the offshore platform 970, if involved in oil exploration, may contain a desalination system 960 used for injecting fresh water down a borehole of an offshore platform (not shown). On the platform 970, the desalination system 960 can use the process of reverse osmosis to produce fresh water from seawater so the freshwater can then be used for filling, fracing, or other platform operations. Because the desalination system 960 can require a great deal of energy to operate, using the wind farm matrix 900 near the desalination system 960 to provide the power can greatly facilitate offshore drilling operations.

The foregoing description of preferred and other embodiments is not intended to limit or restrict the scope or applicability of the inventive concepts conceived of by the Applicants. With the benefit of the present disclosure, it will be appreciated that details described with respect to one embodiment disclosed herein can be combined with or used on other embodiments disclosed herein, even though such combination or use may not be explicitly shown or recited herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An offshore wind turbine, comprising:
   a vertical axis wind turbine comprising a vertically-extending rotor, a plurality of blades coupled to the rotor, and a generator for producing power from rotation of the rotor;
   a floating platform upon which the vertical axis wind turbine is mounted, wherein the floating platform floats in water to support the vertical axis wind turbine above the water surface; and
   an anchoring system coupled to the floating platform for anchoring the offshore wind turbine to a seabed when deployed offshore, the anchoring system comprising an anchor and at least one weight configured for placement between the floating platform and the anchor when deployed offshore, the weight configured to couple via at least one cable to the anchor and at least one pulley on the floating platform.

2. The offshore wind turbine of claim 1, wherein the anchoring system is configured to directly affix the floating platform to the seabed using fasteners when deployed offshore.

3. The offshore wind turbine of claim 1, wherein the anchor is configured to rest on the seabed without being directly affixed to the seabed when deployed offshore.

4. The offshore wind turbine of claim 1, wherein the anchoring system allows a position of the floating platform to adjust to changes in water surface level.

5. The offshore wind turbine of claim 1, wherein the anchoring system is floatable and sinkable.

6. The offshore wind turbine of claim 1, wherein the platform comprises a plurality of legs spreading horizontally from the vertical axis wind turbine.

7. The offshore wind turbine of claim 1, wherein the vertical axis wind turbine is tiltable with respect to the floating platform.

8. The offshore wind turbine of claim 1, wherein the floating platform is passively or actively adjustable to maintain a proper position relative to the water level.

9. An offshore wind turbine, comprising:
   a wind turbine comprising a rotor, a plurality of blades coupled to the rotor, and a generator for producing power from rotation of the rotor; and
   a submersible platform upon which the wind turbine is mounted, wherein the submersible platform is configured to rest on a seabed without being directly affixed to the seabed when deployed offshore such that the wind turbine is above the water surface.

10. The offshore wind turbine of claim 9, wherein the wind turbine is a vertical axis wind turbine with a vertically-extending rotor.

11. The offshore wind turbine of claim 9, wherein the submersible platform is floatable and sinkable.

12. The offshore wind turbine of claim 9, wherein the submersible platform comprises a plurality of legs spreading horizontally from the wind turbine.

13. The offshore wind turbine of claim 9, wherein the submersible platform comprises hollows configured to be controllably flooded or evacuated to float or sink the submersible platform.

14. The offshore wind turbine of claim 9, wherein an axis of the rotor is adjustable relative to the submersible platform.

15. The offshore wind turbine of claim 9, wherein the submersible platform is adjustable to allow the wind turbine to remain vertical when the submersible platform is resting on the seabed.

16. The offshore wind turbine of claim 1, wherein a portion of the at least one cable between the anchor and the at least one weight passes through the at least one pulley on the floating platform.

17. The offshore wind turbine of claim 1, wherein the floating platform comprises a plurality of the at least one pulleys disposed thereon and supporting a plurality of the at least one cables connected between the at least one weight and the anchor.

* * * * *